June 4, 1940. W. W. LANDSIEDEL 2,203,533
COMPUTING AND LISTING MACHINE
Filed Feb. 3, 1938 20 Sheets-Sheet 3

WITNESSES
INVENTOR
Walter W. Landsiedel
by Robert H. Strother
ATTORNEY

June 4, 1940.   W. W. LANDSIEDEL   2,203,533
COMPUTING AND LISTING MACHINE
Filed Feb. 3, 1934   20 Sheets-Sheet 6

WITNESSES

INVENTOR
Walter W. Landsiedel
by Robert H. Strother
ATTORNEY

June 4, 1940. W. W. LANDSIEDEL 2,203,533
COMPUTING AND LISTING MACHINE
Filed Feb. 3, 1934 20 Sheets-Sheet 7
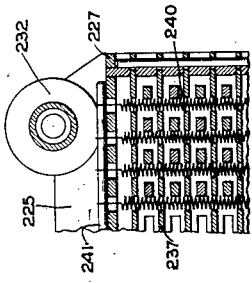
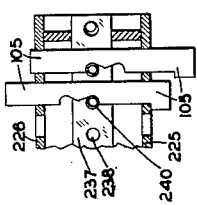
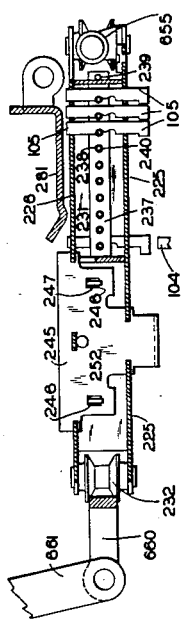
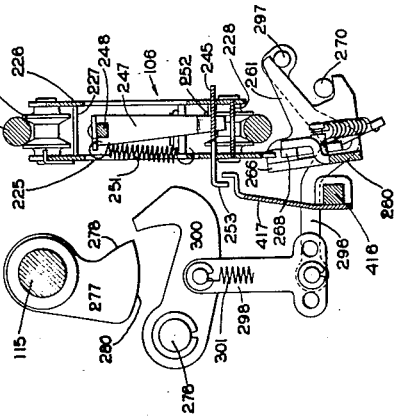
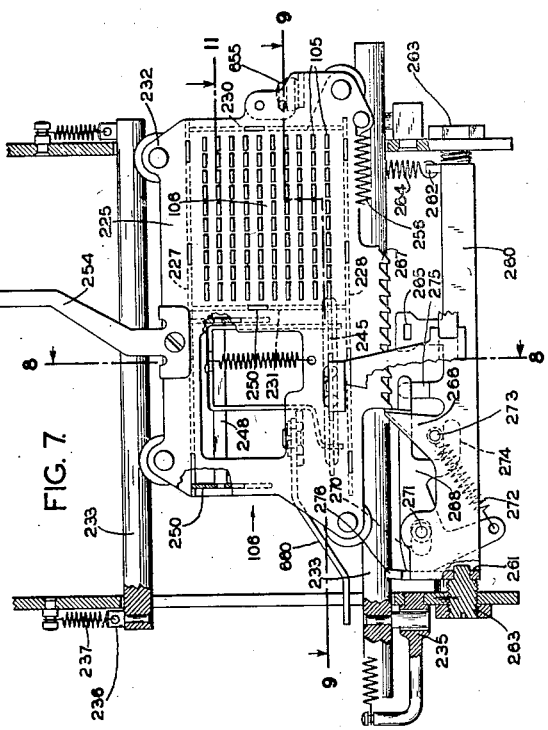
WITNESSES
Francis E. Meyer
INVENTOR
Walter W. Landsiedel
by Robert H. Strother
ATTORNEY

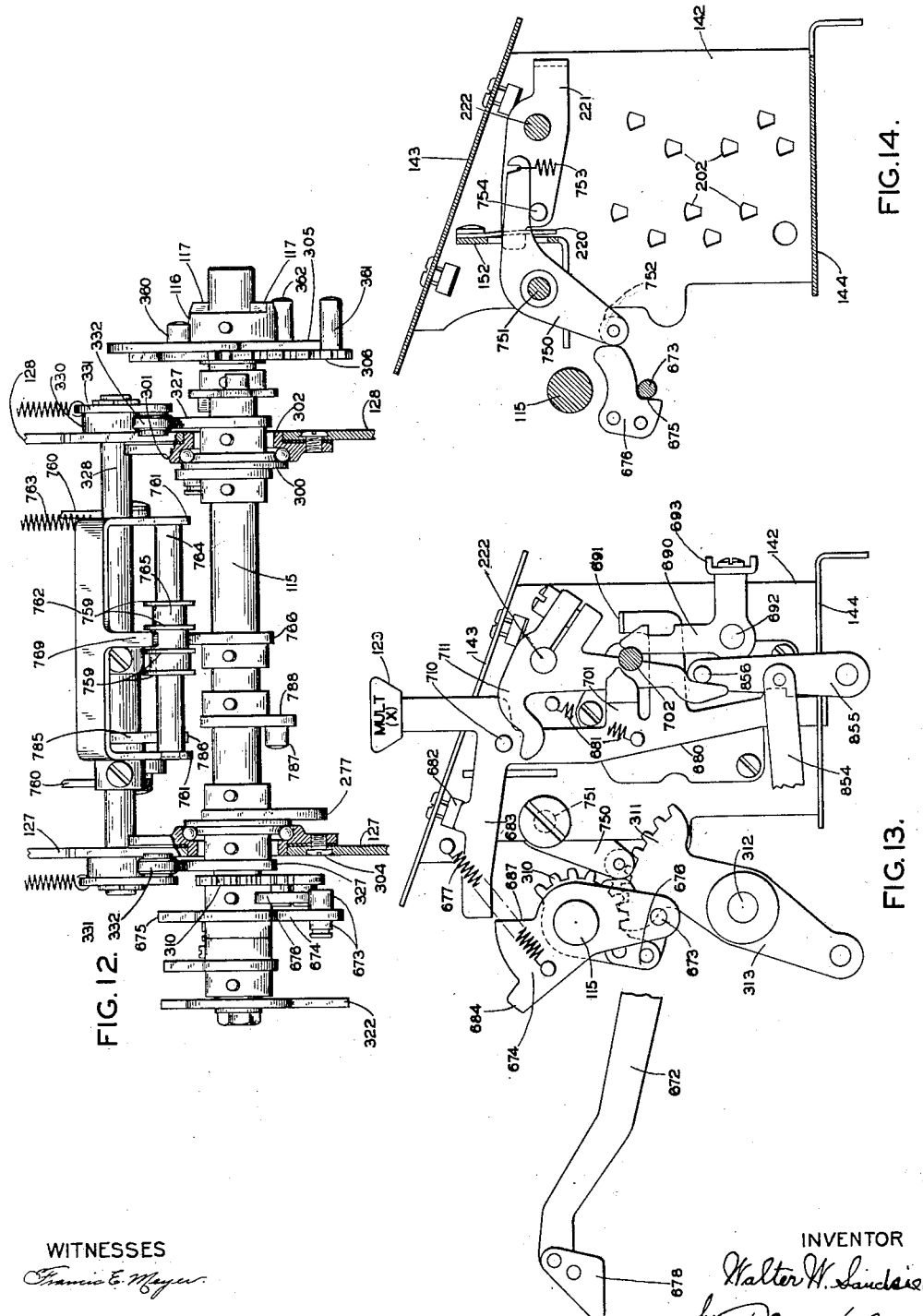

June 4, 1940. W. W. LANDSIEDEL 2,203,533
COMPUTING AND LISTING MACHINE
Filed Feb. 3, 1934 20 Sheets-Sheet 9
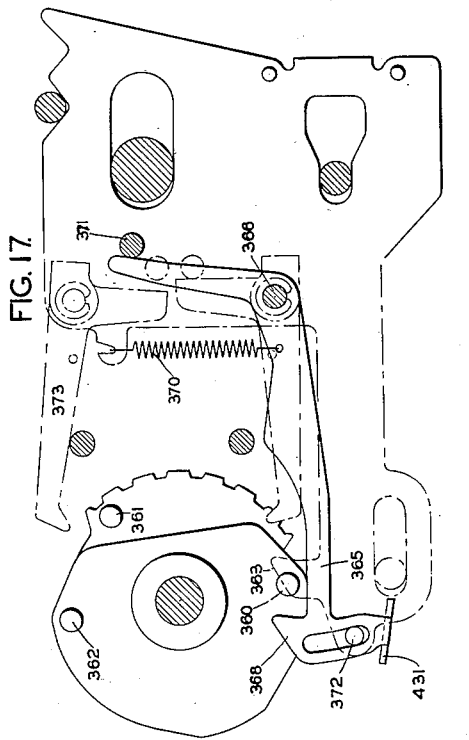
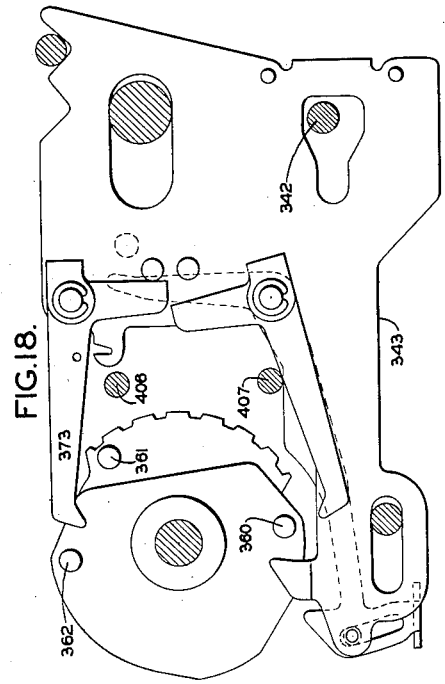
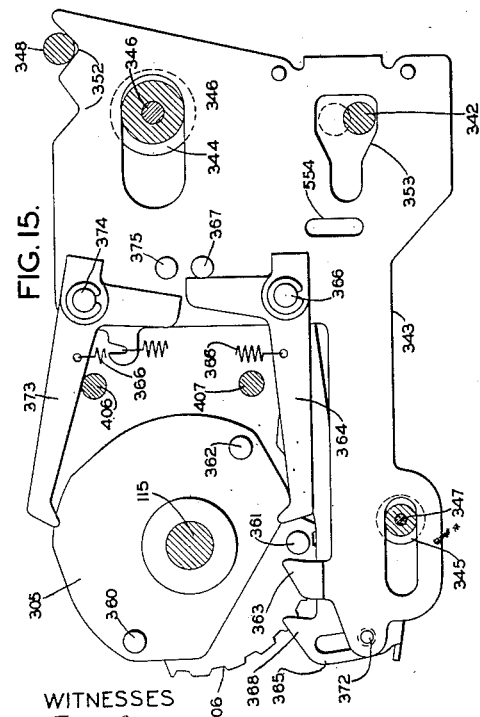
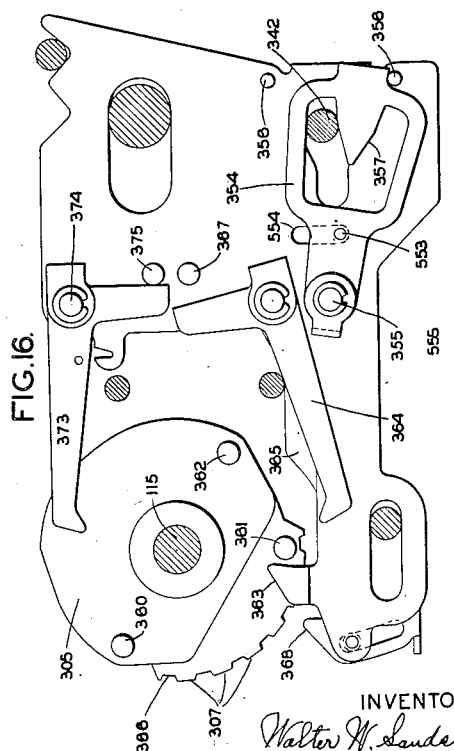
INVENTOR
Walter W. Landsiedel
by Robert H. Strother,
ATTORNEY

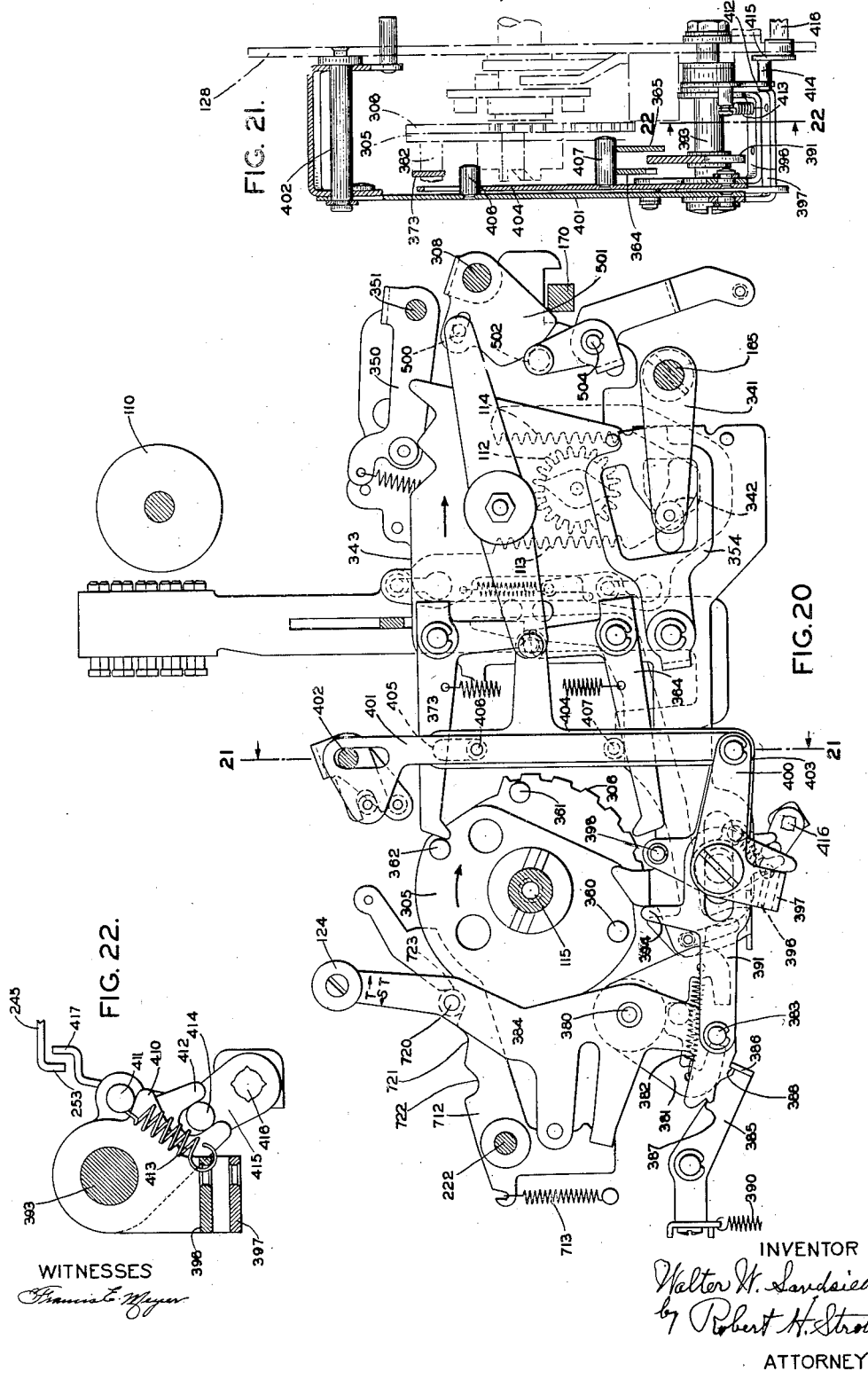

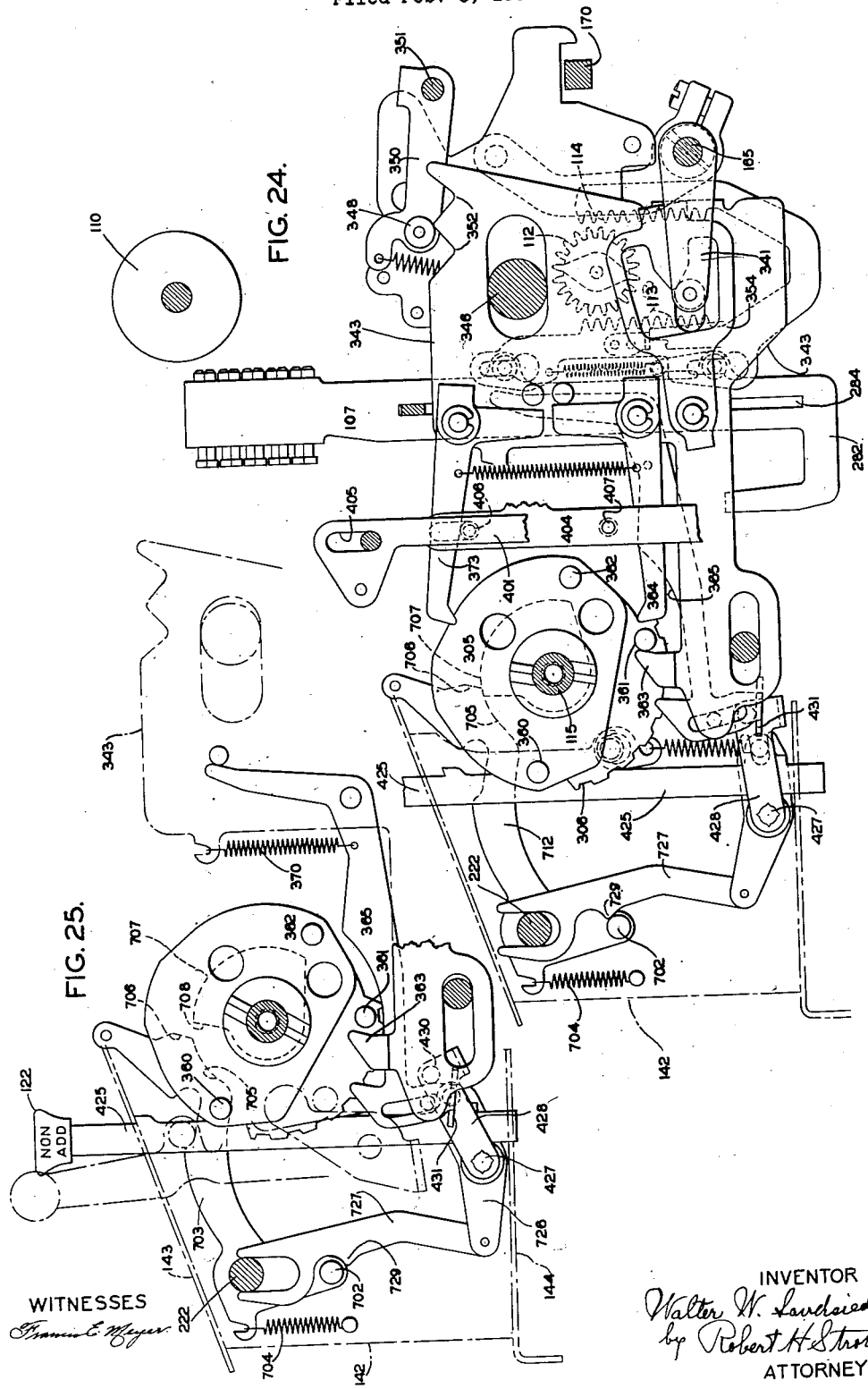

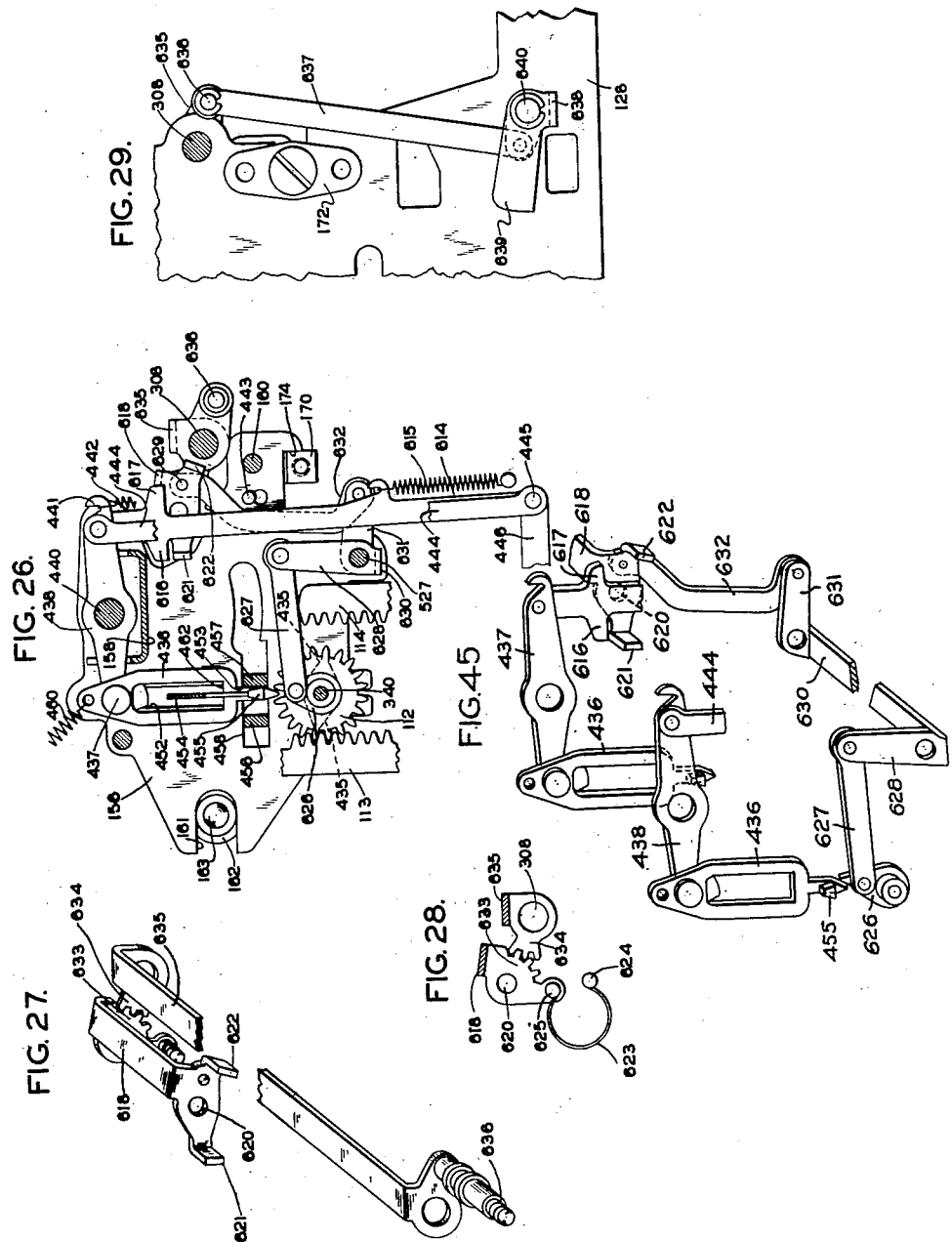

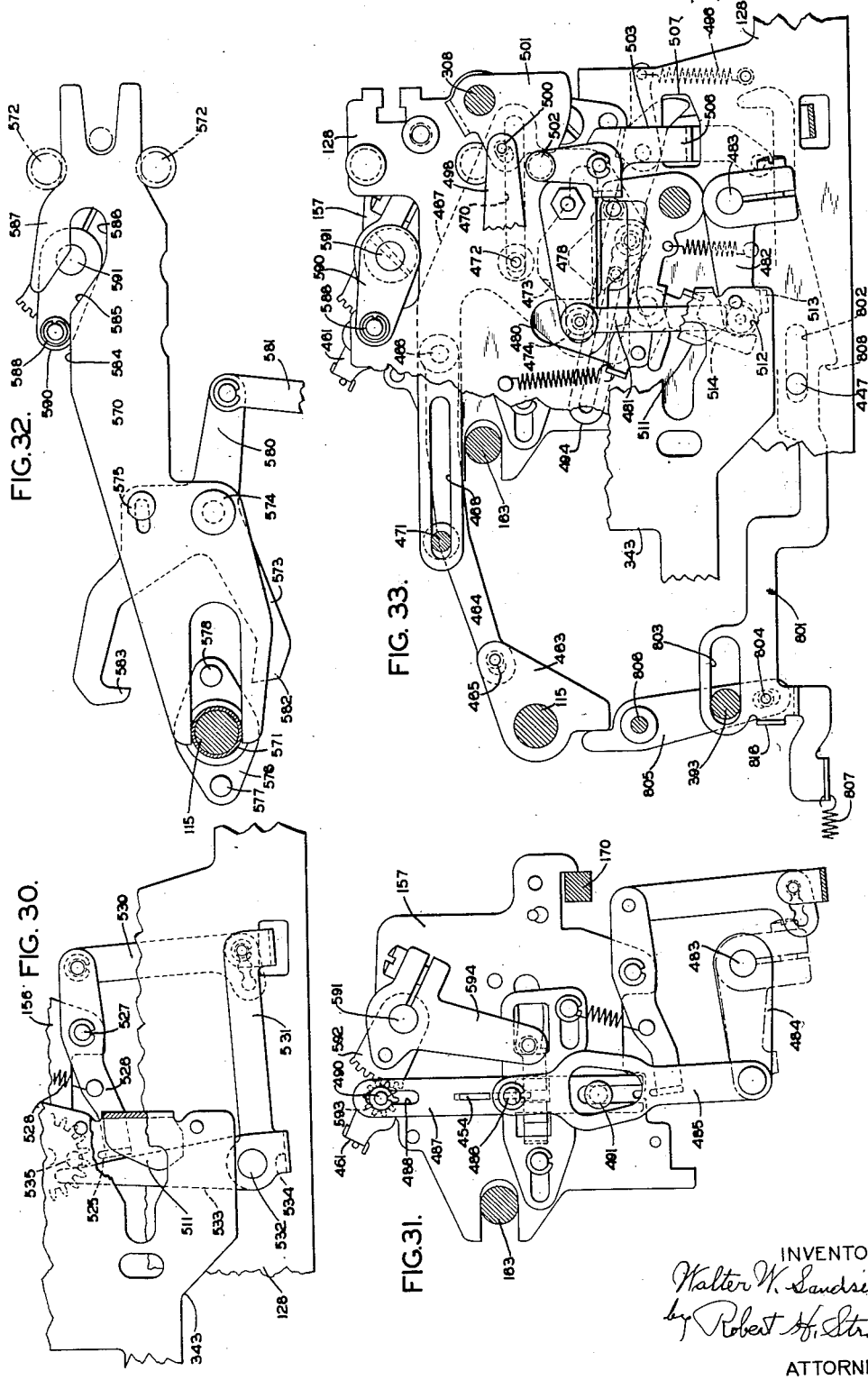

June 4, 1940.  W. W. LANDSIEDEL  2,203,533
COMPUTING AND LISTING MACHINE
Filed Feb. 3, 1934    20 Sheets-Sheet 16

WITNESSES
Francis E. Myer

INVENTOR
Walter W. Landsiedel
by Robert H. Strother
ATTORNEY

June 4, 1940. W. W. LANDSIEDEL 2,203,533
COMPUTING AND LISTING MACHINE
Filed Feb. 3, 1934 20 Sheets-Sheet 18
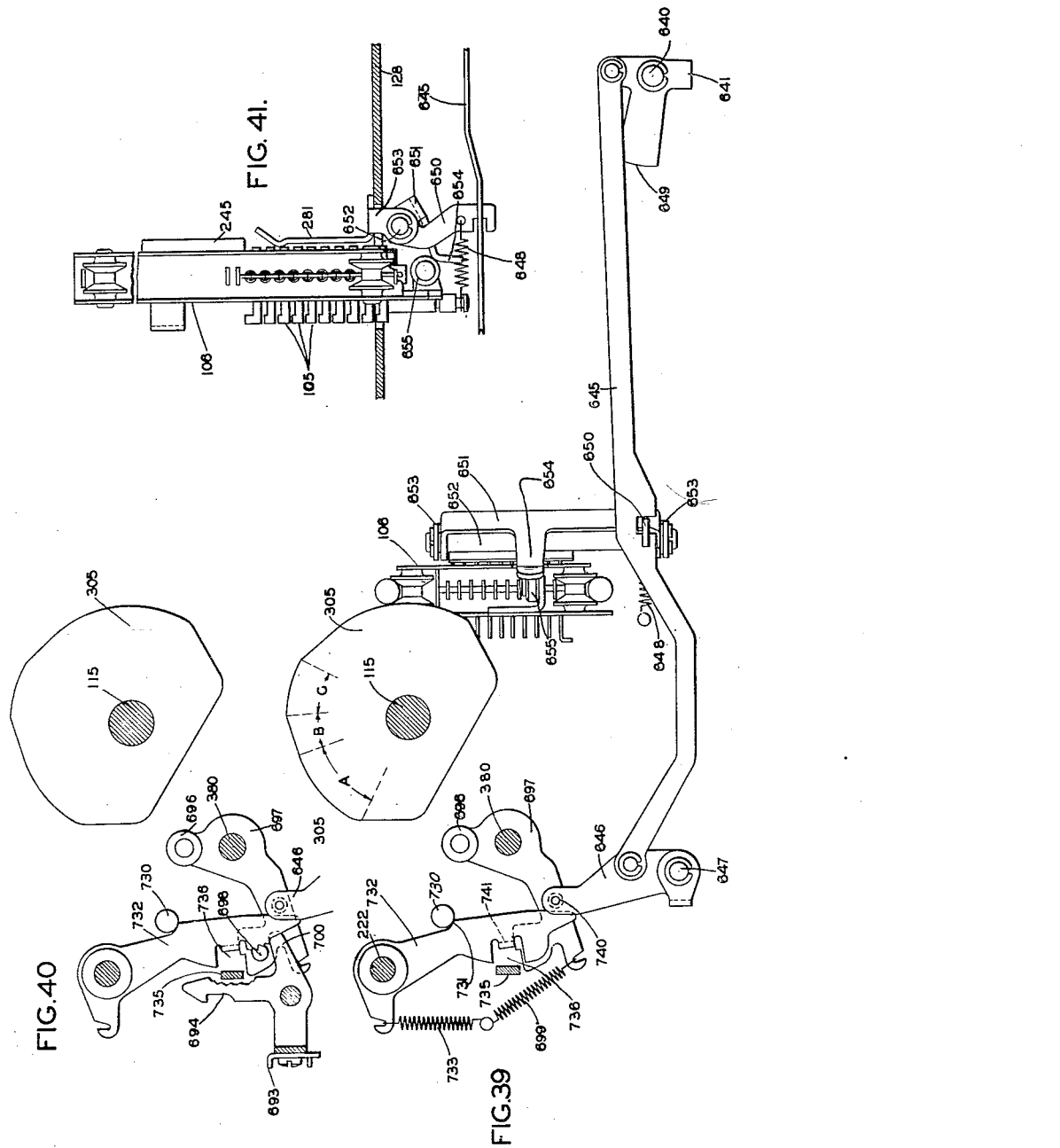

June 4, 1940.  W. W. LANDSIEDEL  2,203,533
COMPUTING AND LISTING MACHINE
Filed Feb. 3, 1934  20 Sheets-Sheet 19

Patented June 4, 1940

2,203,533

UNITED STATES PATENT OFFICE 2,203,533

COMPUTING AND LISTING MACHINE

Walter W. Landsiedel, Norwood, Ohio, assignor to Remington Rand Inc., Buffalo, N. Y., a corporation of Delaware Application February 3, 1934, Serial No. 709,604

14 Claims. (Cl. 235—60)

The present invention relates to computing and recording machines, and it resides in certain improvements, features of construction and combinations and arrangements of parts, all of which will be fully set forth herein and particularly pointed out in the claims.

A specific machine embodying the invention is shown in the accompanying drawings and described in this specification, but it will be understood that some of the features shown and described may be modified considerably without departing from the invention.

The machine described in detail is a small, light and, therefore, portable adding, subtracting and recording machine, preferably driven by a small electric motor and capable of operation at high speed. It is of the ten-key class, the keys setting stops in a stop-carriage. Much of the mechanism is included in separate assemblies, each removable from the machine as a unit. The register wheels are mounted between the forks of actuating racks for addition and subtraction. Provision is made for algebraic computation, the correct balance being automatically printed, whether positive or negative. The transfer mechanism is of novel construction and contains provisions for precision and certainty of operation. The means for controlling the engagement and disengagement of the register, in different sequences for different operations, is novel and effective.

The machine contains control keys for subtraction, non-add, non-print, total and sub total, correction, and repeat, the last capable of giving multiplication rapidly. It also contains numerous interlocks and other safe-guarding devices.

The invention has for its object to produce an improved computing machine in respect of the matters above indicated, and of others which will be apparent from the following description.

In the accompanying drawings,

Fig. 7 is a front elevation of the stop carriage and escapement and associated parts.

Fig. 8 is a vertical section on the line 8—8 of Fig. 7, and looking in the direction of the arrows at said line.

Fig. 9 is a top view in section on the line 9—9 of Fig. 7.

Fig. 10 is a fragmentary enlarged view in transverse vertical section through the stop carriage.

Fig. 11 is a fragmentary section on an enlarged scale on the line 11 of Fig. 7.

Fig. 12 is a front elevation showing the main operation shaft assembly and certain parts operated thereby, the bearings for said shaft being shown in section.

Fig. 13 is a partial left hand elevation showing the repeat (multiplying) key, parts of the stop-carriage-returning mechanism and associated parts.

Fig. 14 is a partial left hand elevation in section just inside the left hand frame plate of the keyboard section of the machine.

Figs. 15-18 are detached diagrammatic views of mechanism concerned in shifting the register into and out of mesh with its actuating racks. In Fig. 15 the parts are in normal position; in Fig. 16 the parts are in position for taking a total with clearing but before the operation mechanism has started; in Fig. 17 the parts are shown at the end of the forward stroke of a computing operation; and in Fig. 18 they are shown at the end of the forward stroke in taking a total (with clearing).

Figure 19:
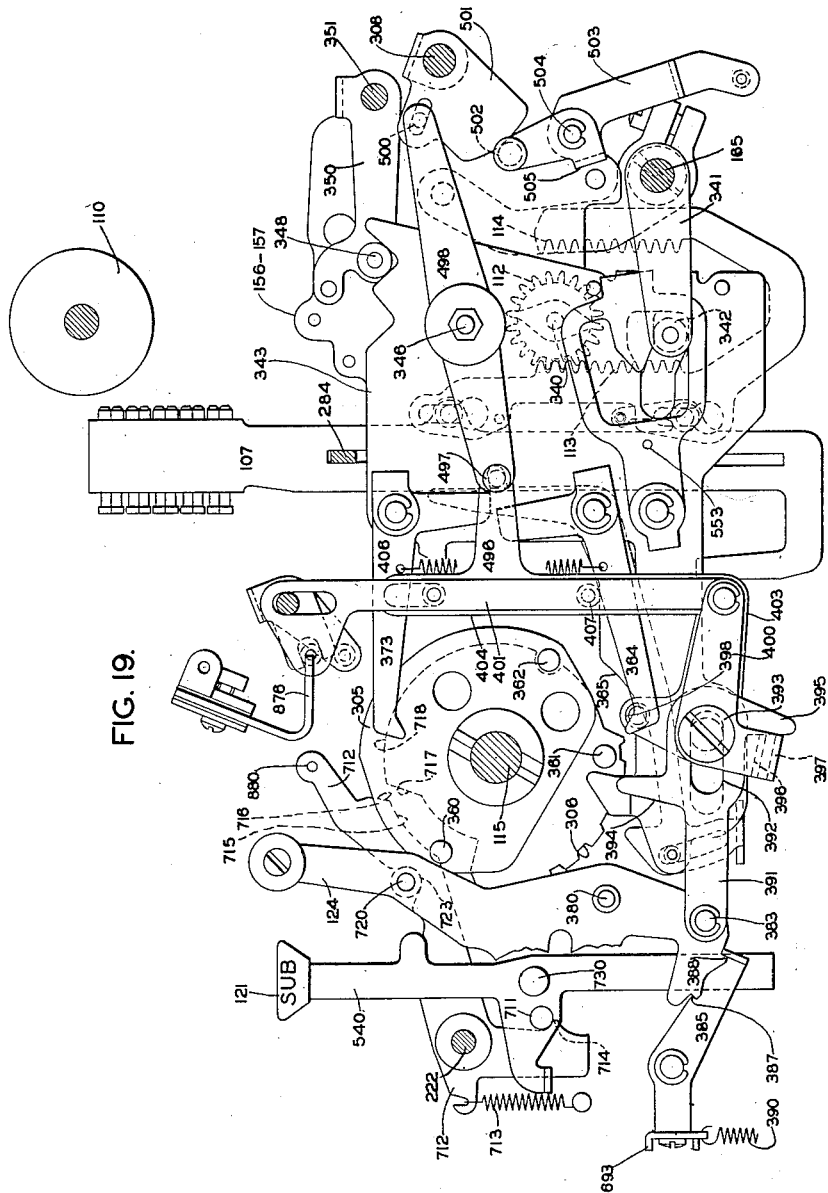

Fig. 19 is a right hand side elevation of some of the mechanism with the total key set for taking a total but the mechanism otherwise normal.

Fig. 20 shows the same setting as Fig. 19 but with the parts as they stand in the course of the return stroke of the operating mechanism.

Fig. 21 is a vertical section on the line 21—21 of Fig. 20 and looking toward the front of the machine as indicated by the arrows.

Fig. 22 is an enlarged section on the line 22 of Fig. 21 and looking in the direction of the arrows at said line.

Figure 23:
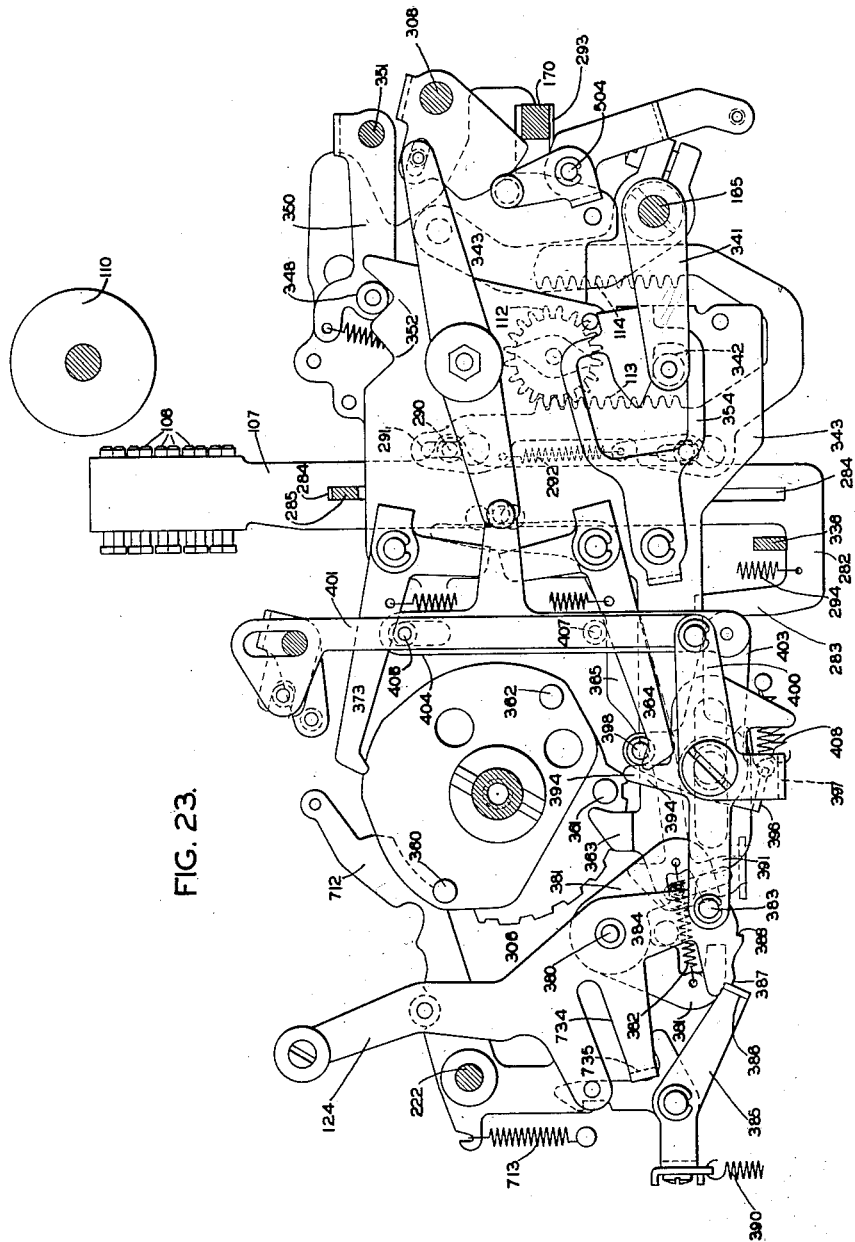

Fig. 23 is a right hand side elevation of a portion of the mechanism with the total key set for taking a sub-total and the mechanism otherwise at normal.

Figs. 24 and 25 are right hand side elevations illustrating the non-add key and its associated parts, said key being in normal position in Fig. 25 and depressed in Fig. 24.

Fig. 26 is a partial right hand side view of the register and transfer mechanisms with parts omitted or shown in section or broken away.

Figs. 27, 28, and 29 are views of the algebraic or "credit balance" mechanism, Fig. 27 being an isometric view and Figs. 28 and 29 detail views.

Fig. 30 is a fragmentary right hand side elevation showing the register wheel aligning device and associated parts.

Fig. 31 is a view from the right and showing some of the parts for controlling the register and its transfer mechanism.

Fig. 32 is a detail view of a portion of the subtraction mechanism.

Fig. 33 is a fragmentary right hand elevation showing some of the mechanism for resetting the transfer mechanism and other parts.

Figure 34:
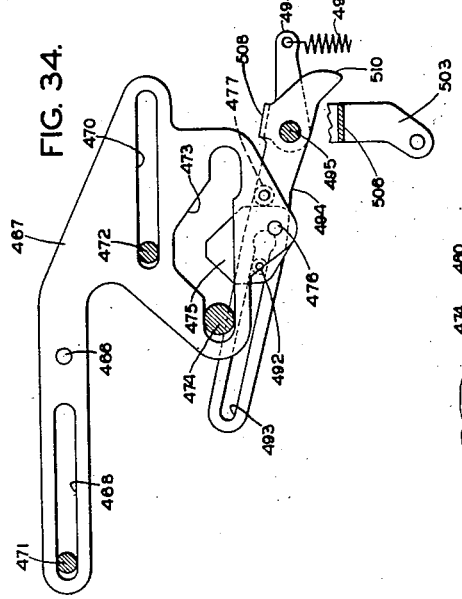
Figure 35:
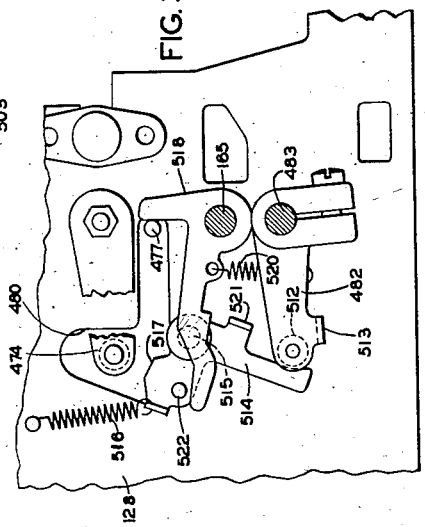

Figs. 34 and 35 are detached views of portions of the transfer resetting mechanism.

Figure 36:
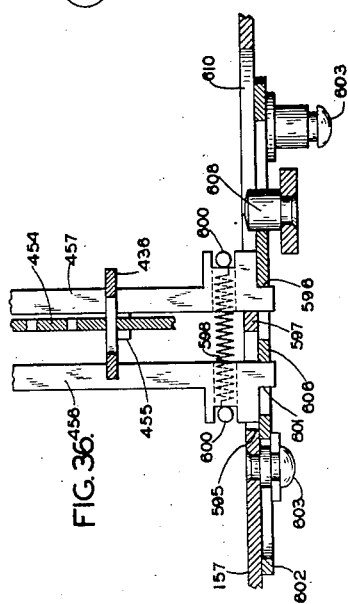
Figure 37:
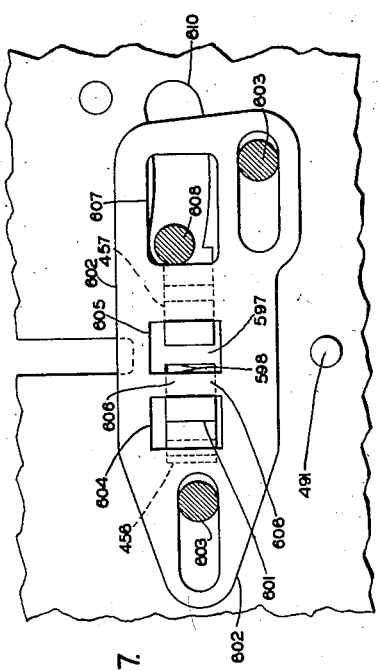

Figs. 36 and 37 are enlarged views of portions of the register concerned with the transfer mechanism, the former being a plan view in section and the latter an elevation as seen from the right.

Figure 38:
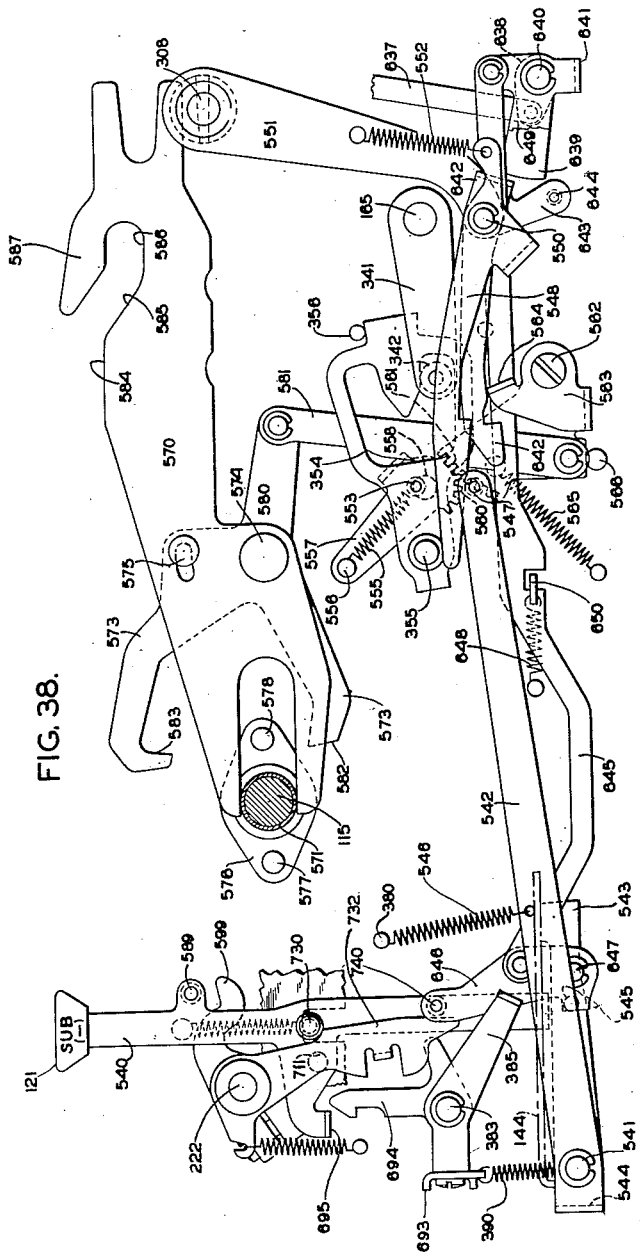

Fig. 38 is a detached view of the subtraction key and some of the mechanism controlled thereby.

Figs. 39 and 40 are right hand views showing more especially the "blank stroke lock" and associated parts.

Fig. 41 is a top plan view of a portion of the same, including the stop carriage.

Figure 42:
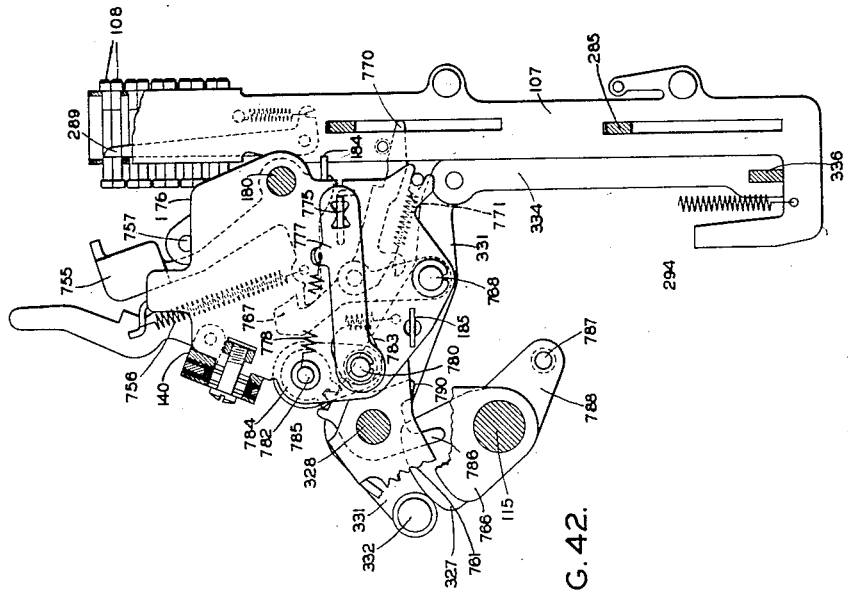

Fig. 42 is a right hand side elevation showing the printing-hammer section and a type bar and some associated parts.

Figure 43:
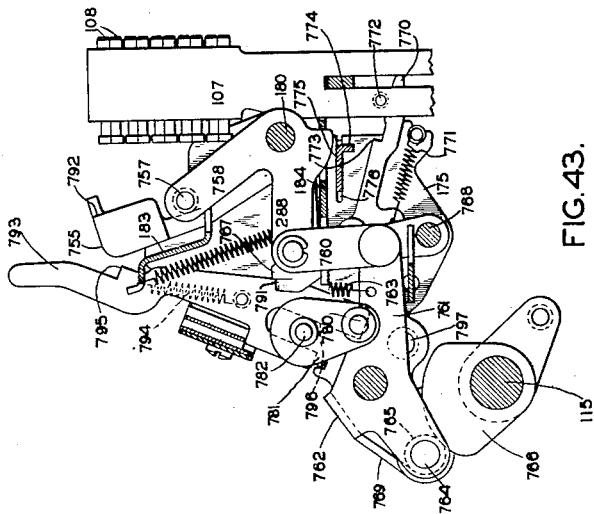

Fig. 43 is like a portion of Fig. 42 but with the right hand frame plate of the hammer section sectioned away.

Figure 44:
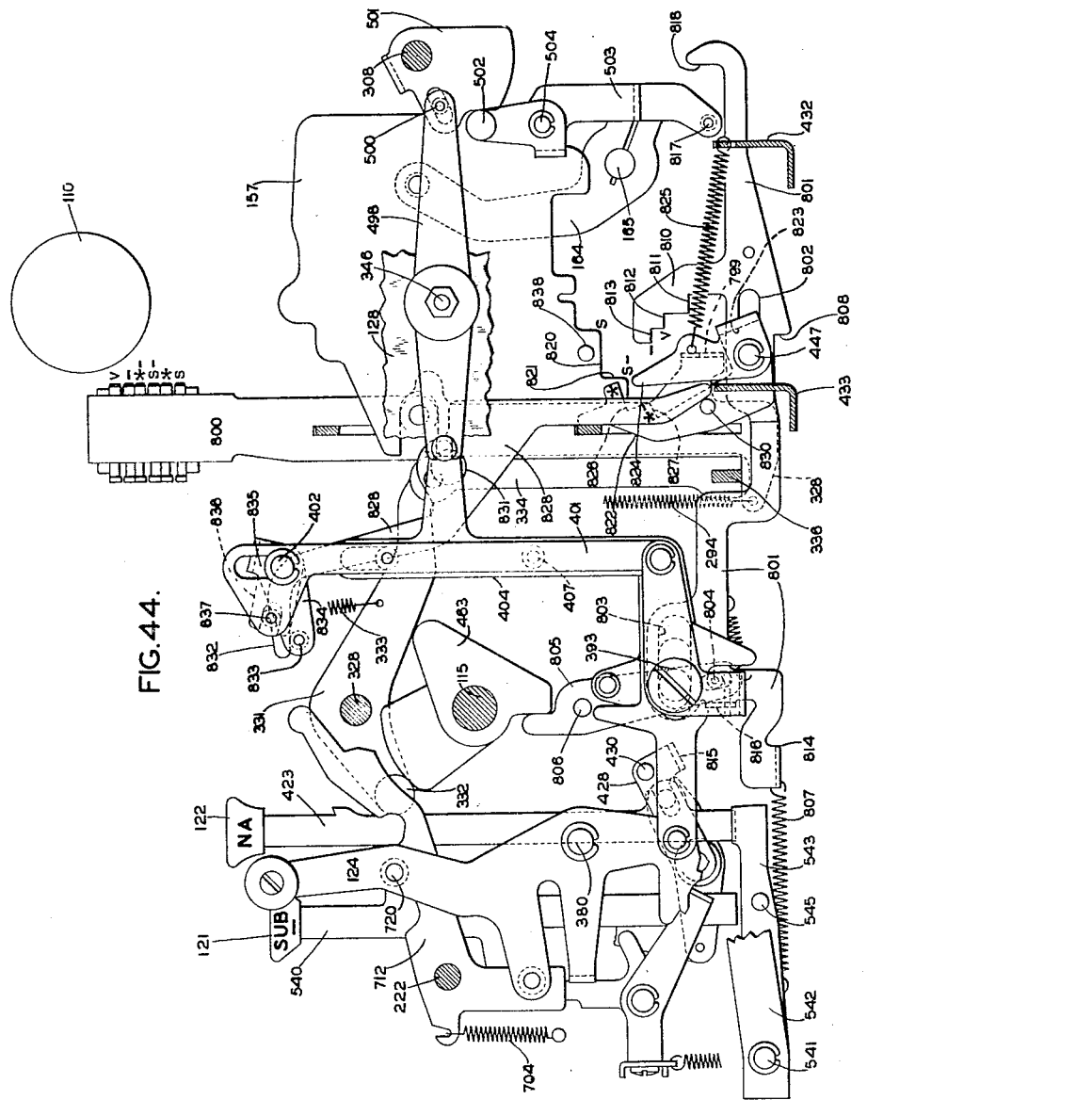

Fig. 44 is a right hand side view illustrating the designation printing mechanism.

Fig. 45 is an isometric view of the means for inserting the fugitive one.

General outline of the machine

Figure 1:
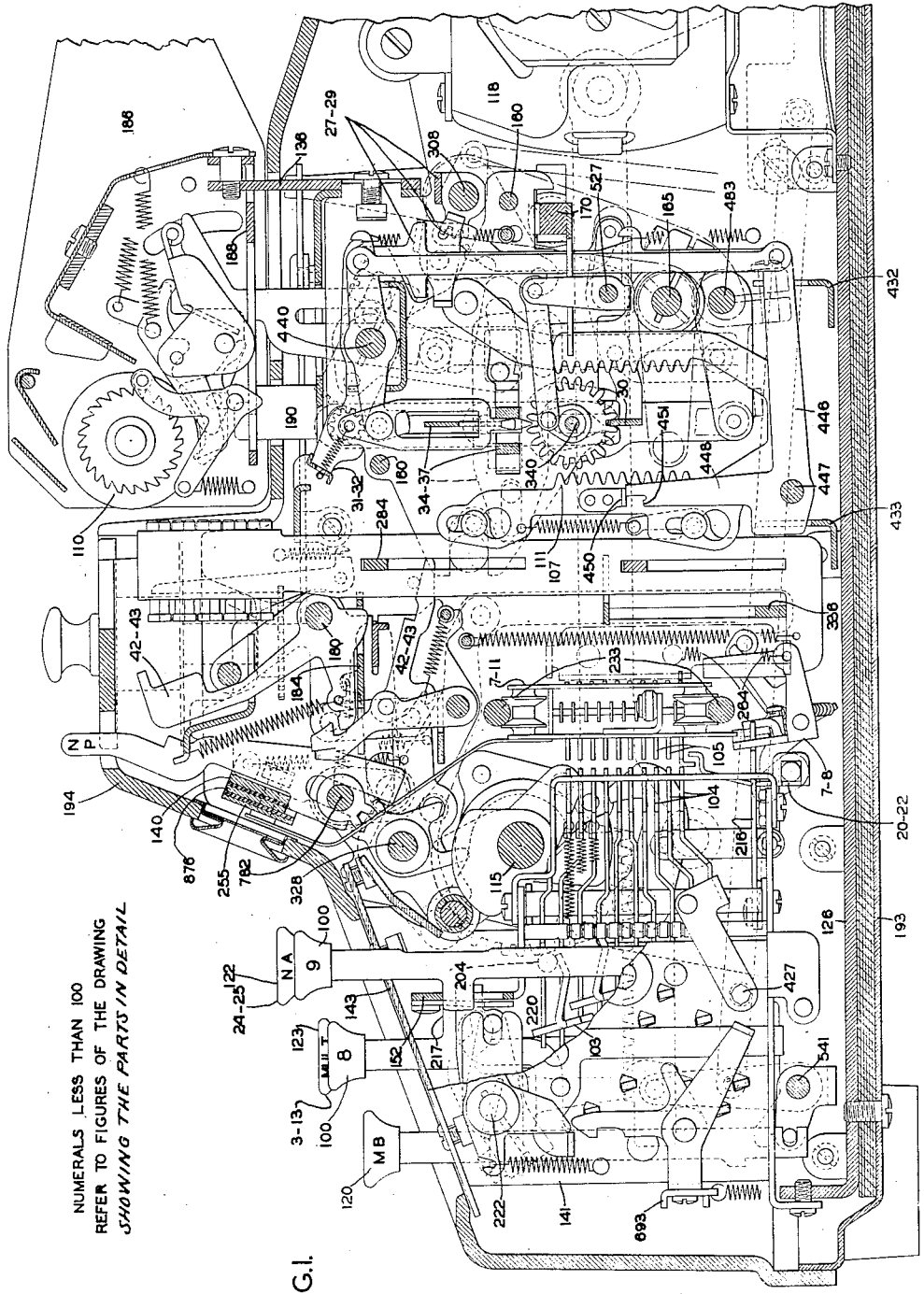
Fig. 1 is a front to rear vertical section through the machine.

Referring to Fig. 1, the machine shown in the drawings has, besides several cont. ol keys, ten numeral keys 100, whose sliding stems 101 have lugs 102 which rock key levers 103 (Fig. 6), which control horizontal push bars 104, which set stops 105, arranged in vertical columns in a stop carriage 106 arranged at the back of the keyboard. The stops 105 control the vertical differential motion of rack-carrying type bars 107, which, at their upper ends, bear types 108 adapted to print on the front face of a platen 110. Each numeral type bar 107 has a double rack bar 111 mounted thereon with freedom of relative motion to the extent of one unit's distance. Each rack bar is made of U shape, and each fork or leg of the bar has rack teeth on its inner vertical edge, the register wheel 112 being mounted between the two racks. In the present instance the forward rack 113 is used for addition and the rear rack 114 for subtraction.

The operating mechanism has for its principal element a main shaft 115, Figs. 1 and 12, which has the usual rocking motion forward and back. It is equipped with a collar 116 having teeth 117 (Figs. 2 and 12) for operation by a handle, but in the present instance it is operated by a motor 118.

The machine is equipped with a motor bar 120 to start the motor, a subtract key 121 (Figs. 2 and 38), a non-add key 122 (Figs. 3 and 25), a multiplying (repeat) key 123 (Figs. 3 and 13) a total and sub-total key 124 (Fig. 2) and a correction key 125. (Fig. 3).

Framing

An understanding of the mechanism of this machine will be facilitated by first considering the framework. The machine has a main frame and several detachable units or assemblies, the framework being constructed entirely of sheet metal and tie rods, as best shown in Figs. 4 and 5.

The main frame has for its principal members a base plate 126, a left-hand side plate 127 and a right hand side plate 128, the side plate secured to the base plate by screws 130 threaded into ears 131 bent up from the base plate. The side plates are tied together at several points. Thus, a top plate 132 interlocked with the side plates, extends across the machine, being stiffened by a flange bent down from its rear edge. This flange is pierced at each side plate with a vertical slot in which two lugs 133 of the side plate are fitted. A screw 134 passes through the plate 132, and through a slot in the side plate and is threaded into a nut 135 lying in an enlargement of the slot. This fastening device, which we may call an interlock and screw fastening, is used in many places in the framework. This particular screw also secures in place a sheet metal post 136, which helps to support the paper and platen section of the machine. The plate 132 is also secured to the side plate at 137 (Fig. 4) by short open ended slots by which the two plates interlock. These two connections are described as characteristic of the construction. This plate 132 can be removed by removing the two screws 134 and sliding the plate rearward to disengage the connection at 137.

Figure 4:
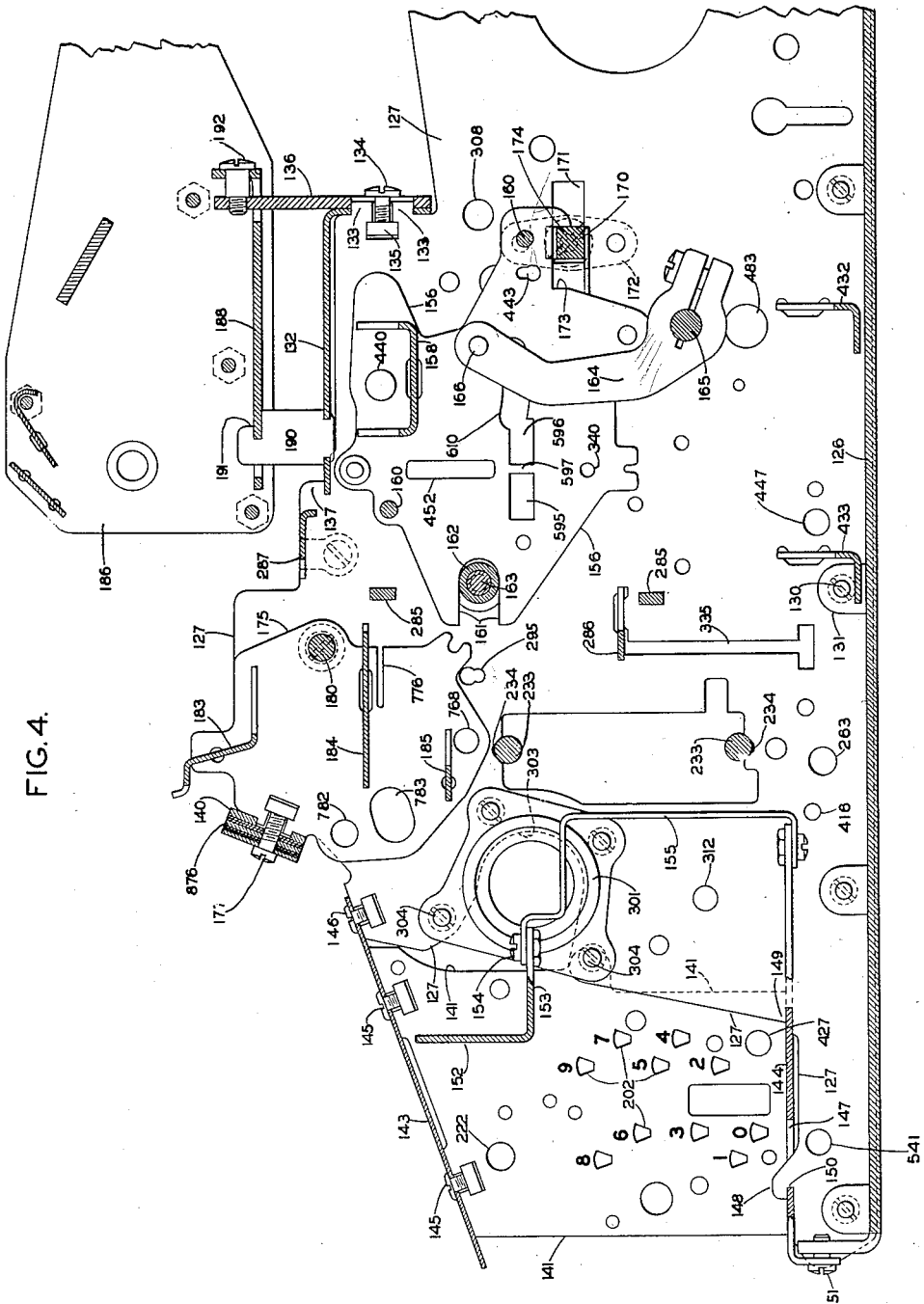
Fig. 4 is a front to rear vertical section showing the framework with nearly all of the movable mechanism removed.
Figure 5:
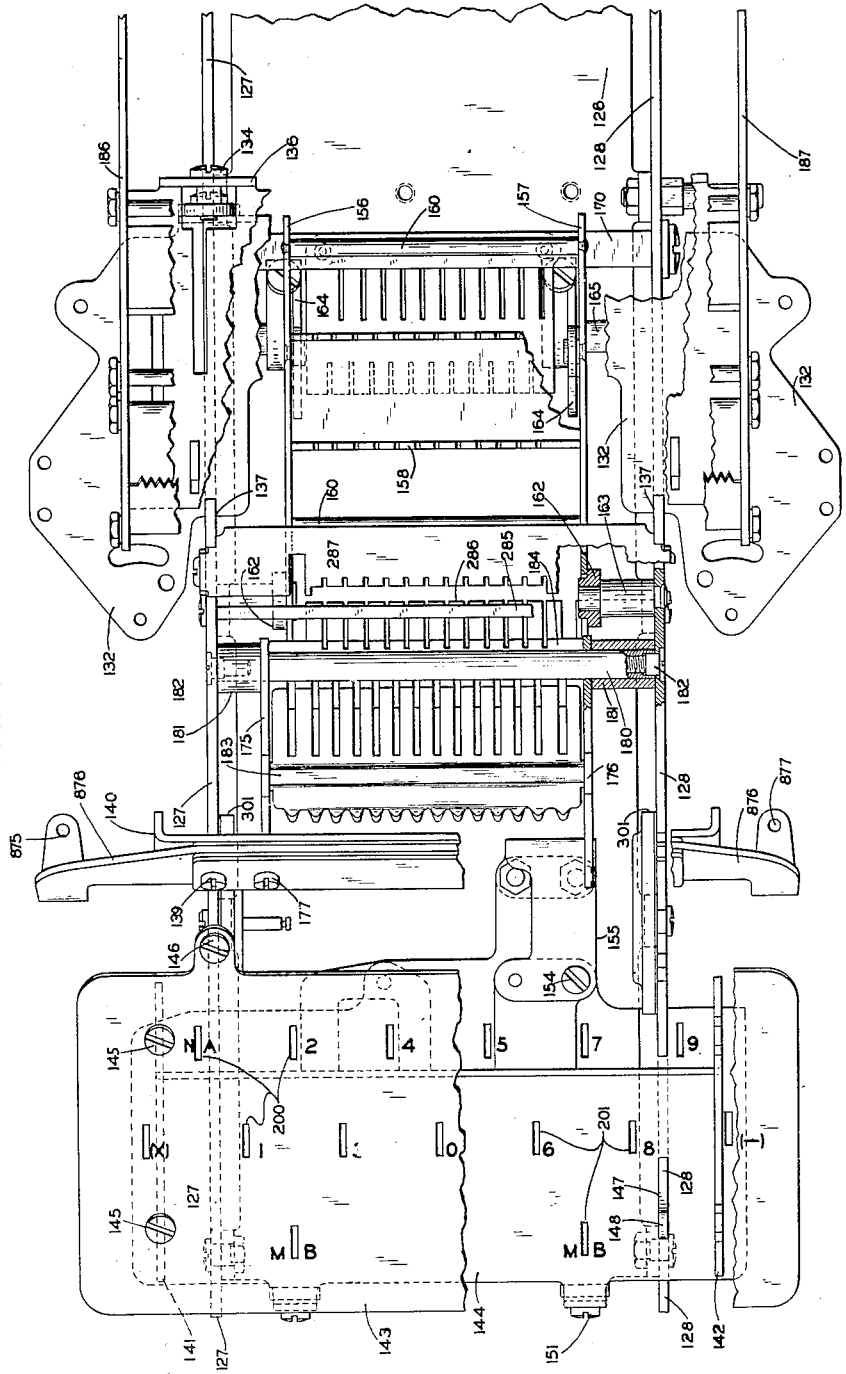
Fig. 5 is a top plan view of the same with some parts in section and some parts broken away.

Just back of the keyboard, the side plates 127 and 128 are connected by a cross bar 140, secured as shown at 139 in Figs. 4 and 5, by an interlock and screw fastening resembling that shown at 133—135.

It may be worth while to trace the outline of the side plate 127 in Fig. 4, in order not to confuse it with certain other frame plates. Its edge is designated by 127 at a number of places. At the rear, it is shown broken away where it extends to support the motor. Its highest point is at the hammer section, and it falls away between the latter and the keyboard section, where it has a large cut-out for a ball bearing for the main shaft 115, and it has a narrow horizontal part projecting forward beneath the keyboard section. The right-hand side plate is of an outline generally similar to this one.

Much of the mechanism of the machine is mounted in detachable units or assemblies, whose location can be understood from Figs. 4 and 5.

The frame of the detachable keyboard section comprises two side plates 141 and 142 which (Figs. 5 and 6) are spaced wider apart than the main plates 127 and 128. These are connected by a top plate 143 and a bottom plate 144, the former secured to the side plates by the interlocking and screw fastening indicated at 145, and the latter by lugs projecting from the side plates into slots in the base plate and riveted up. The top plate 143 is detachably secured to the main side plates 127 and 128, by the interlock and screw fastenings 146. The base plate 144 has two slots 147 into which ears 148 project from the side plates 127 and 128, respectively, said lugs being undercut at 150 (Fig. 4). When the keyboard section is put into the machine, the ears 148 are inserted in the slots 147 and the section pushed toward the rear, thus interlocking the two frames.

Also, at 143, the side plates 127 and 128 are undercut and the rear edge of the base plate 144 is slotted, so that when the keyboard is pushed rearward the frames interlock at these points. The parts are then secured in position by the screws 146 and by other screws 151 passing through ears bent down from the base plate 144 and screwed into ears bent up from the main base plate 126. A cross frame-bar 152 is fastened to the side plates 141 and 142 as by mortise-and-tenon joints, and an ear 153 bent rearward therefrom has secured thereto at 154 the upper end of a strip 155 whose vertical portion is pierced with a tier of slots one above the other and which are the guides for the rear ends of the key-operated push bars 104. The lower end of this strip is secured at 155 to a rearwardly projecting portion of the base plate 144.

The keyboard section with its mechanism in it can be removed from the machine by removing four screws at 146 and 151, and by unhooking certain operating parts.

The register section is mounted in the back part of the machine between the main side plates 127 and 128. Its framing includes left and right hand side plates 156 and 157 respectively, Figs. 4 and 5. The principal transverse connecting member consists of a U-shaped double comb plate 158, secured at its ends to the side plates 156 and 157 as by riveted tenons. The side plates are also connected by two tie rods 160 reduced at their ends to provide shoulders, and riveted into the side plates, thus making a rigid frame. This whole frame with the mechanism in it, is shiftable bodily to three positions, namely, a forward position shown in Fig. 4, where the register wheels 112 are in mesh with adding racks 113; a middle or neutral position where, as shown in Fig. 1, the wheels are out of mesh, and a rear position where the wheels are in mesh with the subtracting racks 114. Each of the side plates 156, 157, has at its forward end an open-ended slot 161 which embraces an anti-friction roller 162, journalled on a shouldered stud 163. There are two of these studs, one projecting inward from each of the main side plates 127 and 128, and they constitute the supports and guide for the forward portion of the register frame. Said frame is supported and guided at its rear part by two arms 164 rigidly secured to and projecting upward from a transverse rock shaft 165, which is journaled in the main frame plates 127 and 128. Each of these arms is pivoted to one of the side plates 156 or 157 by a pivot study 166 riveted into the side plate. The register section is shifted from one to another of its three positions by rocking the shaft 165.

A square cross bar 170, extending through horizontal slots 171 in the main side plate 127 and 128, is secured in position by screws screwed into its ends and passing through small plates 172, which, in turn, are fastened to the outer sides, respectively, of said main side plates. The bar 170 has two slots in its upper surface, one for guiding each of the side plates 156, 157 against lateral deflection, but too deep for said side plate to bottom in them, the up and down guiding of the section being done by the arms 164. The rear part of each side plate 156, 157 has two shoulders 173, 174, which, by contacting with the bar 170, limit the rearward and forward movements of the register section.

The register section, with its mechanism assembled, may be removed bodily from the machine by removing the top plate 132, loosening the bar 170 so that it can slide front and back in the slots 171, and uncoupling certain operating parts, including the arms 164. These latter are shown mounted on the shaft 165 by split-hub clamps which can readily be loosened.

The hammer section has two side plates 175 and 176, which are secured to the cross bar 140 by the interlock and screw construction shown at 177. When the hammer section is removed from the machine, it is preferable to remove the screws at 139, treating the bar 140 as a part of this section, rather than of the main frame. There is a cross shaft or rod 180 constructed and arranged as shown in Fig. 5. This rod passes clear through the rear part of the hammer section, and is surrounded at its projecting ends by collars 181, which space the side plate 175 from plate 127 and plate 176 from plate 128; and screws 182, threaded into the ends of the rod, secure the whole structure rigidly together. This section can be removed from the machine by removing the four screws at 139 and 182 and uncoupling certain operating connections. The hammer section also includes three transverse comb plates 183, 184 and 185, which may be mounted in the side plates 175 and 176 by mortise and tenon joints.

The paper and platen section may be of any suitable construction, and may in some instances include a traveling carriage, though none is shown in the present instance. The plates 110 has its axle journaled in two side plates 186 and 187, which are suitably secured to a base plate 188 which is supported by the posts 136 hereinbefore referred to, and by two other posts 190 riveted to and rising from the top plate 132. The plate 188 may be secured to the ports 190 by the interlocking slot construction indicated at 191. The posts 136 may each have a reduced upper part projecting through a slot in the plate 188, and a screw 192 may be inserted through an ear of said plate and threaded into said part as shown in Fig. 4, thus making a rigid and secure mounting, which, however, can be removed by removing the two screws 192 and sliding the plate 188 toward the rear.

Figure 2:
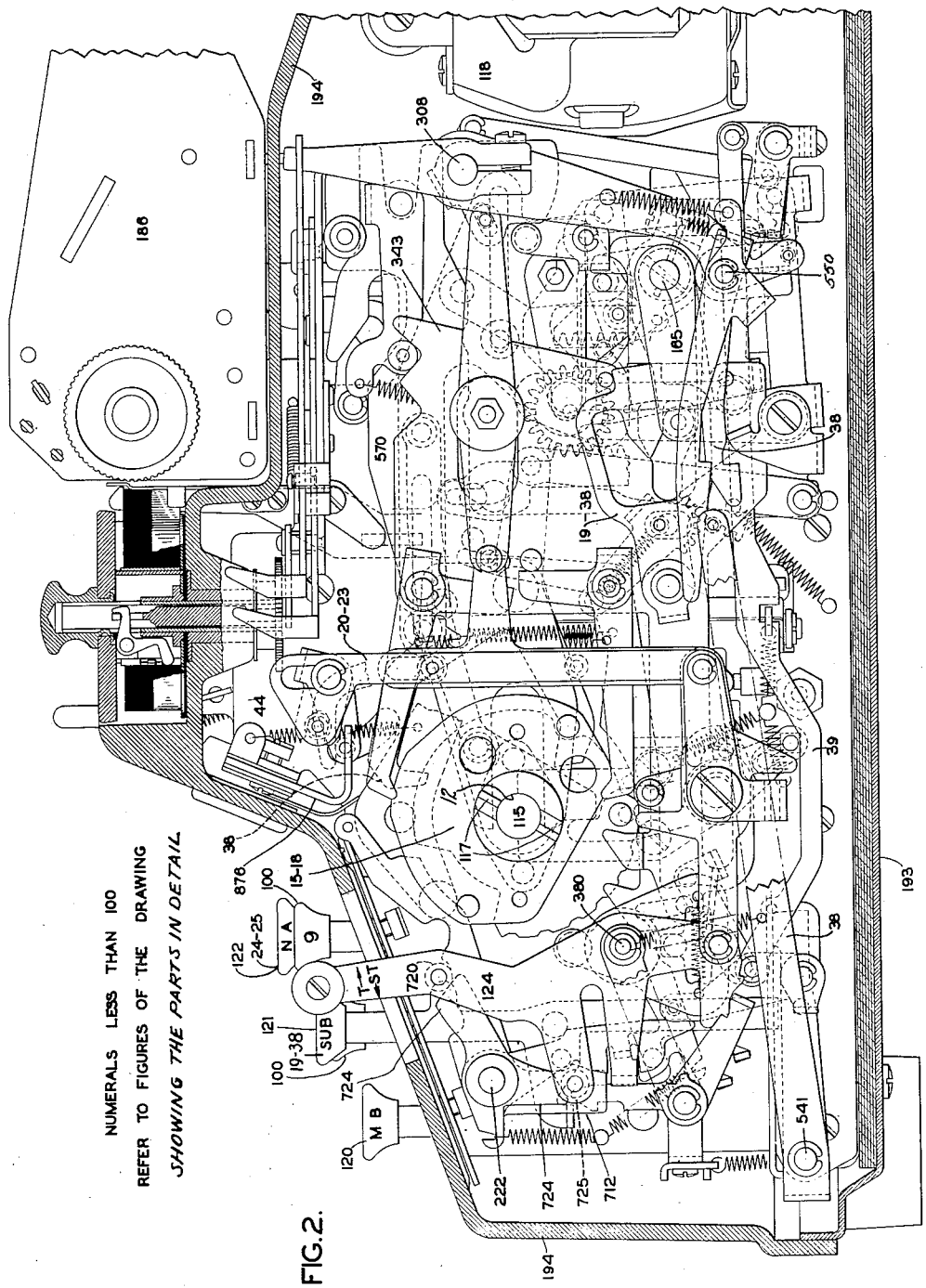
Fig. 2 is a right hand side elevation with the casing shown in section.
Figure 3:
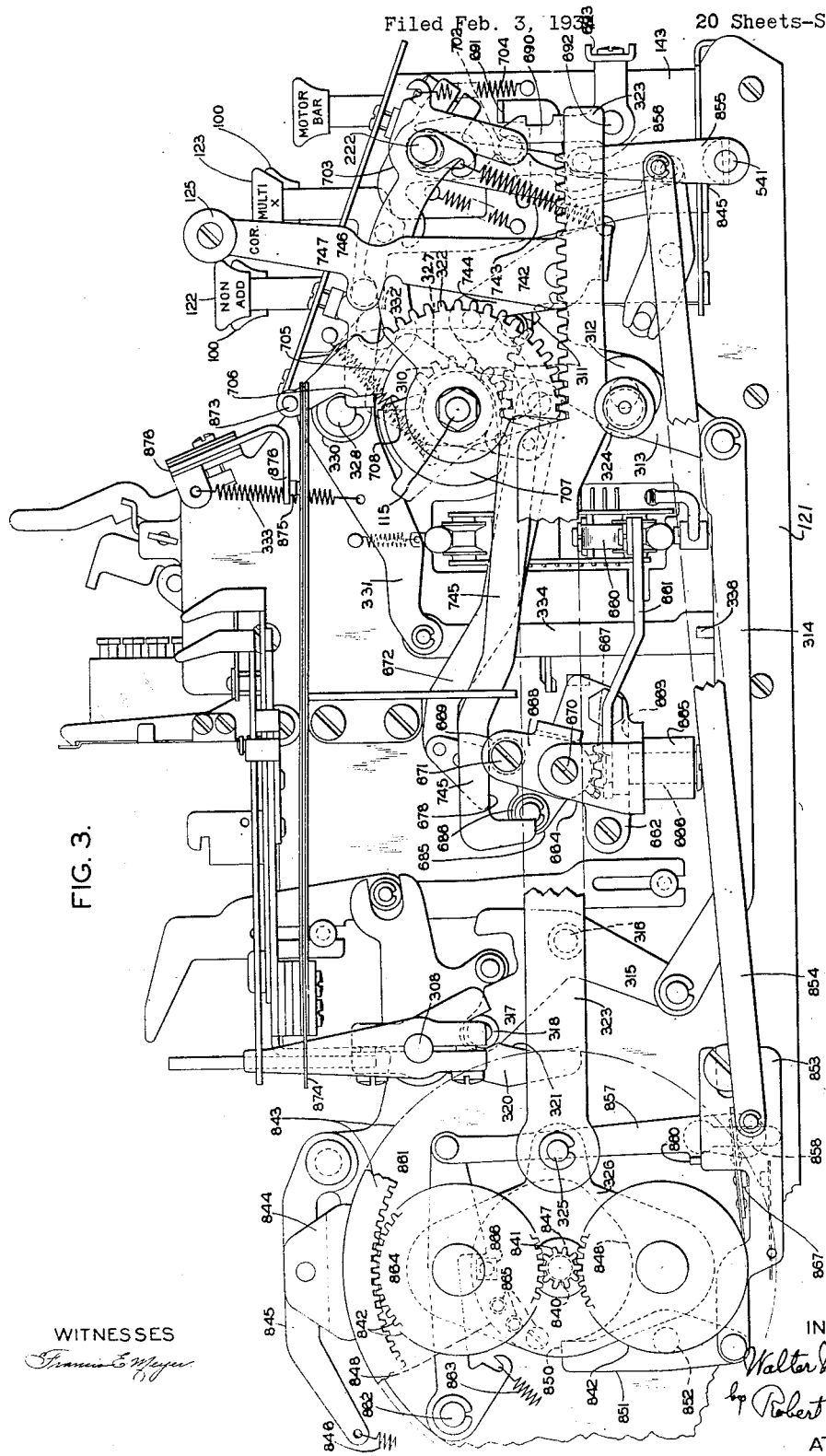
Fig. 3 is a left hand side elevation with the casing and the paper-handling mechanism removed.

As shown in Figs. 1 and 2, the base plate 126 may be mounted in or on a base-casing-plate 193, here shown as drawn into the form of a shallow pan; and any suitable casing 194 may be arranged to cover the mechanism. Preferably a layer of sound-deadening material 195 is interposed between the plates 126 and 193.

*The numeral keyboard*

The stems 101 of the numeral keys 100, and also the similar stems of some of the control keys (Figs. 1, 5 and 6) are guided in slots 200 in the top plate 143 of the keyboard section and by registering slots 201 in the base plate 143. These slots and, therefore, the keys are arranged in two transverse rows, and, in Fig. 5, the several slots are designated to indicate the locations of the several keys.

The key levers 103 consist of sheet-metal bars, each having its ends of reduced width and pivoted in sector-shaped openings 202 in the side plates 141 and 142. In Fig. 4 these are designated by the appropriate numerals, 0–9. Each of the levers or rockers 103 has at the proper place in its length an arm 203 formed off rearward from its upper edge, and each key stem 101 has either an arm or lug 102 bent sideways from it, or else a pin 204 projecting sidewise from it, such arm or pin overlying its associate arm 203, so as to rock the lever 103 when the key is depressed. The openings 202 and the levers 103 are arranged in a somewhat irregular pattern, the 0 being the lowest and the others at progressively greater elevations but distributed front and back so as to give each lever room to rock independently of any other. The ears 102 and the pins 204 are each so disposed as to give a suitable effective length to the lever arm 203. Each lever or rocker bar 103 has an upwardly extended part 205 (Fig. 6) through a slot in which projects the forward reduced end of one of the push bars 104, which bar is shouldered just back of the lever 103, so that a rocking of such lever pushes the bar 104 rearward. All of these upward extensions 205 and push bars 104 are arranged in a single front-to-rear vertical bank. Each such extension 205 is pierced with a slot 206, and the lever is cut away in a sort of inverted V below said slot. The levers are all made as just described merely for uniformity so that they can all be punched with the same die, these peculiarities being needed in only a few of them. For example, the "1" push bar 104 just clears the "3" lever 103 by reason of the inverted V cut-out in the latter; and the "8" push bar 104 passes loosely the slot 206 in the "9" lever 103. The whole arrangement is such that the push bars 104 all extend rearward one above the other, the "0" bar at the bottom and the "9" bar at the top, as shown in Fig. 1. The several bars are bent up or down as required, so that their rear ends all project through the uniformly spaced slots 206 in the guide plate 155.

Each bar 104 is made with a hook 207 for a returning spring 208, all of said springs being connected to a vertical post 210 rising from the base plate 144 and having annular grooves for the springs.

Figure 6:
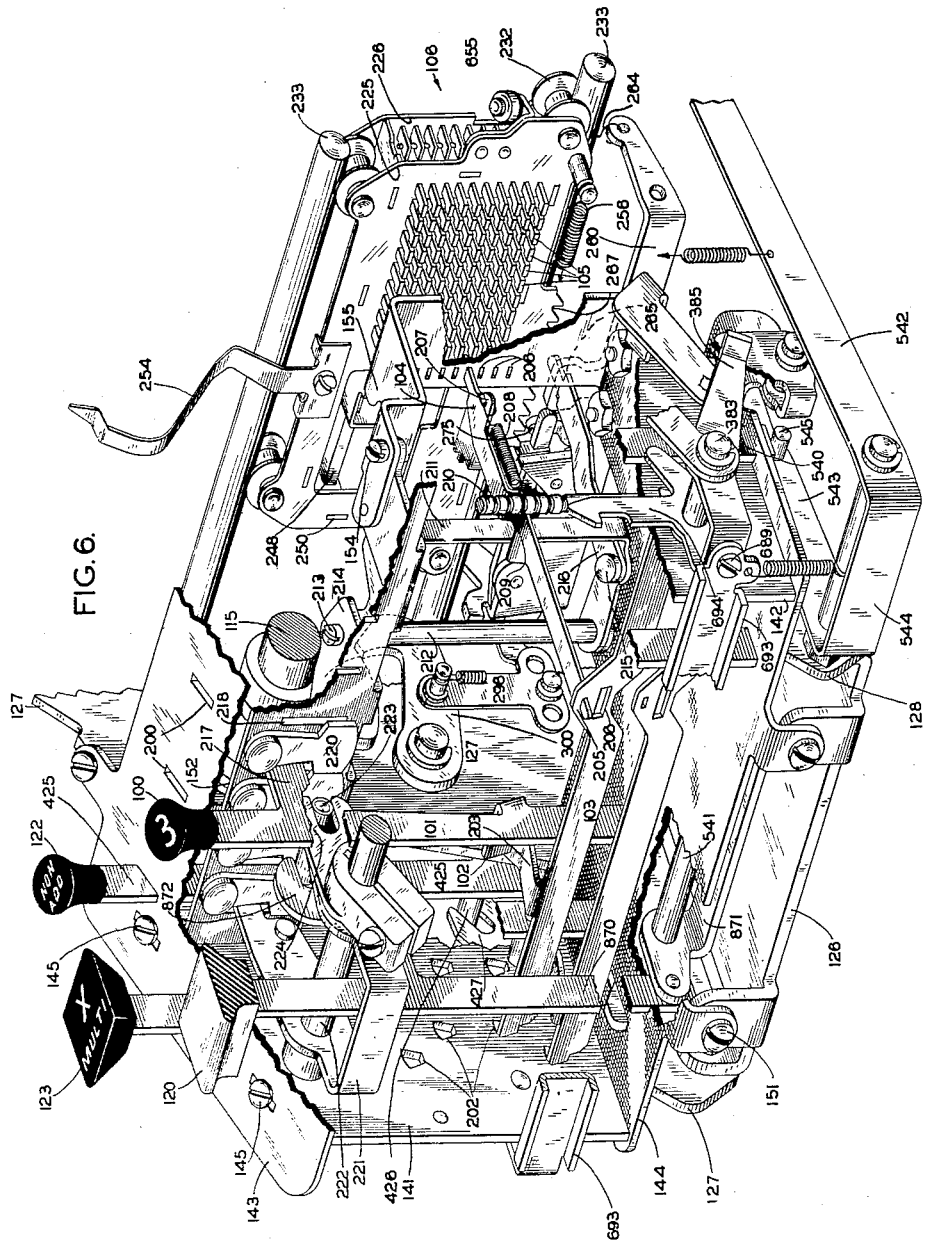
Fig. 6 is a perspective view of the key-board and some associated parts, with parts removed or shown in section or broken away.

A universal bar 211, Fig. 6, consists of a vertical bail bar, whose horizontal arms at top and bottom are secured to a rock shaft 212. Each of the push bars 104 has a shoulder 209 for rocking this universal bar. The shaft 212 is pivoted at its lower end on a pivot screw threaded through the base plate 144. The pivot screw 213 for the upper end of this shaft is screwed through a bracket 214 bent rearward from the cross-bar 152. The lower arm of the bail 211 has pivoted thereto at 215 a push bar 216 which operates the escapement for the stop carriage 106, which will be described hereinafter.

A so-called key-arrester, or single key device, is provided for the numeral keys. The cross bar 152 is situated beneath the top plate 143 and between the two rows of key stems 101. Each numeral key stem has an arm 217 (Figs. 1 and 6) projecting from its front or rear edge as the case may be and passing through a vertical slot 218 in the bar 152. Pivoted to the front face of said bar are the pendants 220 usual in such devices and which act in the usual way to prevent the depression of more than one numeral key at a time.

In order to interlock the numeral keys with various other parts of the machine, the last slot 218 at the left is occupied by an arm of a bail 221, which is mounted on a transverse rock shaft 222, which is journaled in and projects at both ends beyond the side plates 141 and 142. The other arm of the bail 221 has a pin or stud 223 projecting both right and left therefrom, and the right-hand part of said stud is embraced by a forked arm 224, rigidly secured to the shaft. The bail 221 is, therefore, in effect rigid on the shaft, the described mode of making it so being only for convenience of manufacture. The shaft 222 is connected with various parts of the machine as will be described hereinafter. The construction is such that said shaft cannot be rocked when any numeral key is depressed, and, when said shaft is rocked, the numeral keys are locked against depression.

*The stop carriage*

The stop carriage 106 is shown in Figs. 1 and 6–11. Its framework consists essentially of front and rear vertical plates 225 and 226, spaced apart by and fastened to an upper horizontal strip 227, a lower horizontal strip 228, a right-hand vertical strip 230, a middle vertical strip 231, and certain other members to be described. The horizontal and vertical strips or frame members may have tenons projecting from their edges through mortises or slots in the front and rear plates, said tenons being riveted up at their ends. The rigid frame thus constructed has at each of its four corners a grooved roller 232 journaled between the front and rear plates on a rivet pin, and running on upper and lower rails 233, each consisting of a round rod suitably secured at or near its ends in the main side plates 127 and 128 of the machine. In Fig. 4 is shown the opening in the plate 127 for this carriage, and at the top and at the bottom of this opening are V-shaped notches 234 in which, respectively, the rails are seated. As shown in the present instance, a block 235, Fig. 7, riveted to the outside of the frame plate, has a vertical pin which projects into a hole in the lower rail to prevent endwise motion of the latter. The upper rail has just outside each frame plate a pin 236 to which is connected an upwardly pulling spring 237, which holds the rail in the seat 234. The construction is such that, when the carriage is out of the machine, the rails may be very readily removed, the upper one by unhooking its two springs and the lower one by lifting it off of its two pins.

In the right hand half of the carriage, between the strips 230 and 231, the front and rear plates 225, 226 are pierced with rectangular slots for the sheet metal stops 105, said slots arranged in vertical columns of ten each. In the present instance ten such columns are shown. Each stop consists of a piece of sheet metal of the shape shown in Fig. 11; that is to say, it is in the form of a small bar with a projecting lug at its forward end to limit its inward motion, and with two notches in one edge for retaining it in its normal and its set positions. These stops can be inserted into the frame after the latter has been assembled.

In order to retain the stops yieldingly in their two positions, a series of horizontal strips 237 is provided, one strip between each two consecutive rows of stops and mounted at their ends in the vertical strips 230 and 231, and each perforated with a series of holes 238. The frame strips 227 and 228 are made with corresponding holes, and a series of small, closely coiled springs 240 are extended vertically through the series of holes thus provided. Each spring at its upper and lower ends may be hooked over wires 241 (Fig. 10), lying one above the strip 227 and the other beneath the strip 228. These springs can be readily inserted and removed after the carriage frame has been assembled. The springs 240 press into the notches in the stops 105 and serve as detents for the latter, the strips 237 imparting just the right degree of stiffness thereto for the purpose. Said strips are inserted endwise from the right after the carriage frame is constructed, and are retained in place by a wire 239 inserted in holes in them and in the frame strips 237 and 238.

A zero stop plate 245 constitutes the most essential element in the left-hand half of the stop carriage. In the present instance, this is a plate of sheet metal having the general outline shown in Fig. 9. It occupies the lower part of the carriage in line with the zero stops 105, and is of such dimensions that, when the carriage is in its normal position, the projecting rear part of this plate would arrest all of the type bars 107 in position to print zeros. This plate projects through a long slit in the rear frame plate 226, and through a shorter one in the forward frame plate 225. As the carriage travels to the left, this stop passes successively beyond one after another of the type bars, leaving them to be controlled by the stops 105.

In order to take totals it is necessary that this stop be withdrawn toward the front of the machine to inoperative position. To this end it has a limited forward sliding motion, in order to allow which the middle vertical frame strip 231 has a suitable slot cut in its rear edge. In order to guide this plate for parallel motion it is made with two rectangular openings 246 into which project the ends of a U-shaped bail 247, which is mounted on and secured to a square rock shaft 248 pivoted in the upper part of the carriage in two frame plates 250 provided for the purpose. A spring 251 is tensioned between an ear of the bail 247 and the frame plate 225, this spring tending to hold the stop plate in its operative position shown in the drawings. The motion of the stop plate under the impulse of said spring is limited by an extrusion 252 stuck up from the stop plate in position to be arrested by the frame plate 226. At its forward part, plate 245 projects out in front of the carriage and is formed with a depending ear 253 for cooperation with the devices for withdrawing the stop in total taking operation as will be described hereinafter.

An index finger 254 is secured to and projects upward from the carriage, and cooperates with a scale plate 255 (Fig. 1), secured to the cross bar 140 and visible through a slight opening in the casing, thus giving to the operator of the machine a visual indication of the position of the carriage.

The carriage is drawn toward the left by a long tension spring 256 secured to the right-hand end of the carriage and anchored at a convenient point near the extreme left-hand side of the machine.

*Carriage escapement*

The carriage escapement comprises a dog rocker in the form of a long bail bar 260 having arms 261 and 262 projecting therefrom toward the rear of the machine and pivoted on pivot screws 263 adjustably screwed through the main side plates 127 and 128. A tension spring 264 (Fig. 1) tends to rock the upper edge of the bar 260 toward the front of the machine. This bar has an upward projection pierced with a suitable hole 265 for the reception of the reduced and shouldered end of the push bar 216, which is worked by the universal bar 211 of the numeral keyboard. The bar 260 has an upwardly projecting tooth 266, which constitutes the fixed dog of the escapement, which tooth, as shown in Figs. 1 and 8, is normally out of engagement with the series of rack teeth 267 on the under edge of the frame plate 225 of the carriage.

The stepping dog 268 consists of a piece mounted on the bar 260, as shown in Figs. 1 and 7. This dog has a tooth, which is normally about in register with the tooth 266, and which is normally in engagement with the rack teeth 267. This dog has a slot 270 by which it is mounted on a headed pin 271, projecting rearwardly from the bar 260. A tension spring 272 connects a depending arm of the stepping dog with a stud 273, projecting rearwardly from the bar 260. The tension of this spring tends partly to rotate the dog 268 about the pin 271 as a pivot, and partly to slide the dog bodily toward the right. The pivotal motion of the dog is limited by a finger 274 thereof engaging the stud 273. The dog is normally pushed by the tension of the carriage spring 256 into its left-hand position, shown in Fig. 7, but when the dog rocker is rocked rearward by a depression of a key and this dog moves out of engagement with the rack, it jumps bodily to the right in position to engage the next oncoming tooth when the dog rocker is returned to normal position. The end of the dog 268 is prolonged toward the right and a lug or finger 275 is offset from the bar 260 in such a position as to serve as a guide for the free end of the loose dog. The left-hand arm 261 of the dog rocker is shaped into a tooth 276 so located as to serve as a final stop for the first tooth of the rack 267. This tooth 276 is of such width that the rack can not escape beyond it even though the dog rocker be oscillated.

When the carriage is returned to its right-hand position the teeth of the escapement 267, engaging the tooth of the stepping dog 268, depress the latter with a rocking motion about the pin 271, so that in this operation this dog acts like a pawl, the escapement being free to move past it toward the right, but being arrested against motion toward the left.

The rocking motion of the dog rocker is limited by a stud 270 (Fig. 8), projecting from the main side plate 127 into a fork in the arm 261.

As will be described hereinafter, the carriage is returned to its initial position during the latter part of the return motion of the main shaft 115. It will be perceived that the carriage can return without injuring the machine only in case the loose dog 268 is in engagement with the rack. In order to insure that the shaft 115 be not rocked when the dog rocker is out of normal position, and in order to insure especially that the latter be in normal position during the return movement of the carriage, an interlock is provided, which is shown in Figs. 6 and 8. An angle lever 296 is pivoted on the left-hand pivot screw 263 by the end of the dog rocker, and it has a pin 297 lying in contact with an edge of the dog rocker arm 261, so that, when the dog rocker is rocked, it rocks this lever clockwise in Fig. 8. Said lever is connected by an adjustable link 298 with a dog 300 pivoted at 276 to the frame plate 127 and drawn downward by a spring 301. On the main rock shaft 115 there is rigidly mounted a sector 277 having an abrupt radial surface or edge 278 and a concentric edge 280. The construction is such that, when the dog rocker is rocked clockwise, in Fig. 8, the dog 300 is moved upward and blocks any motion of the main shaft 115. Also on the return motion of the shaft 115, during that part of such movement in which the carriage is being returned, the concentric edge

280 is moving across the end of the dog 300 so as to prevent said dog from rising. Even if the dog were in its upper position at the moment this device would force it to its lower position and thus force the dog rocker into its proper position. The construction is such that the dog rocker can not be rocked out of its normal position during the time in which the carriage is being returned.

A wiper plate 281, secured to and projecting leftward from the main side plate 128, serves to cam the stops 105 back to normal position when the carriage is returned to the right. In that operation, as will appear hereinafter, the carriage is returned a suitable distance beyond its normal position so as to restore the last row of stops, and then allowed to step back into position where they can be operated.

Type bars and racks

Each of the type bars 107 comprises a vertically disposed bar of sheet metal with a suitable structure at its upper end for the sliding types 108 (Fig. 42). These latter are closer together than in most machines of this character so as to make the motions of these parts as short as possible with a view to making it possible to operate the machine at high speed. The computing rack teeth are, of course, made with the same comparatively short spacing. Each type has a cut-out on one side, forming a shoulder for co-operation with a spring-urged restoring lever 289, common to all of the types in the bar. Each of the bars 107 has, at its lower end (Fig. 23) a forwardly projection arm 282, having a finger 283 projecting upward therefrom, the upper end of which is the part that cooperates with the stops 105 and 245. It has been found convenient to dispose the columns of stops 105 closer together than the spacing of the printing, and the arms 282 are, therefore, slightly fanned inward so that their stop fingers 283 are a little closer together than the main parts of the type bars.

Each type bar 107 has two long slots 284 lettered in Fig. 23, but best shown in Fig. 1, and through these slots project two rectangular bars 285, Fig. 4. These bars are of a length just equal to the outside dimensions of the two main frame plates through which they pass, so that these guide bars can be inserted in place after the type bars have been put into the machine. Each one has its ends covered either by some detachable bracket, or by the head of a screw so as to keep them from coming out of place. These two bars guide the type bars in their vertical motion as far as front and rear deflection are concerned. The type bars are guided against lateral deflection by two comb plates (Fig. 4), namely, a lower one 286 and an upper one 287, both secured to the plates 127 and 128. A third comb plate 184, constituting part of the hammer section, also co-operates with the forward edges of these bars, when that section is in place in the machine. The whole construction is such that, when the top plate 132, and the comb plate 287, and the register section are removed from the machine, these type bars with the racks attached to them may be inserted in place, the two bars 285 thrust through them and anchored in the side plates and the comb plate 287 put into place and secured by screws. The register section can then be inserted in the machine and the top plate 132 put into place.

The racks are best shown in Figs. 1 and 19. Each type bar 107 has projecting rearward therefrom two ears in which are mounted headed studs 290, which guide keyhole slots 291 in the forward member or branch of each of the rack bars 113, 114 for up and down sliding motion, the rack bar being drawn downward by a spring 292 attached at its lower end to a finger of the type bar. The rear branch of each rack bar is guided in a comb plate 293 projecting forward from the square cross bar 170 hereinbefore described. Each type bar is drawn upward by a long spring 294 attached to the arm 282 and anchored to a cross rod located at 295 (Fig. 4). The up and down motion of these type bars and racks is controlled by the operating mechanism by means to be described hereinafter.

Main operating mechanism

The main operating shaft assembly is shown in Fig. 12. The shaft 115 has two ball bearing cones 300 which cooperate with bearing members 301, each of which has a hub portion 302 that fits into the semi-circular opening 303, Fig. 4, in one of the side plates 127, 128. Each bearing member has a flattened portion having the outline shown in Fig. 4 and secured to the main frame plate by four screws 304. The whole construction is such that, when the keyboard section is out of the machine and certain operating parts removed, the main shaft may be removed from the machine by removing these eight screws 304 and drawing the shaft and its bearings outward toward the front.

As mentioned hereinbefore, the shaft has on its right-hand end a hub 116, having crown teeth 117, so that a handle can be inserted on the end of the shaft and the shaft rocked forward and back after the usual fashion in such machines. In case a handle is used a full stroke mechanism is desirable. Adjacent the hub 116 the shaft 115 has rigid thereon two cam discs 305 and 306, the principal functions of which will be explained hereinafter. As shown, for example, in Fig. 16, the disc 306 has on part of its periphery a series of teeth 307 for cooperation with a suitable full stroke pawl of ordinary construction. This pawl is not shown in the present instance because the machine is here shown connected up for motor operation. It can, however, be changed over, the motor being disconnected and the handle put in place.

At the back of the machine there is a second rock shaft 308, Fig. 3, which is rocked by the shaft 115 and which performs functions that will be described hereinafter. Outside of the main frame plate 127 there is mounted on the shaft 115 a segmental gear 310, Figs. 3, 12 and 13. This meshes with another segmental gear 311, which is pivoted to the side plate 127 at 312. This segmental gear has a downwardly extending arm 313, which is connected by a link 314 with an arm 315 of a lever, which is pivoted to the side plate at 316. Said lever has an upwardly and rearwardly directed arm 317, which carries an anti-friction roller 318, which engages in a slot in an arm 320, which is fast on the shaft 308. Said slot is shallow and the arm 320 is prolonged beyond it with a curved surface 321, which, when the lever 320 is rocked, is concentric with the pivot 316. The construction is such that the shaft 308 is rocked clockwise in the first part of the forward motion of shaft 115, and remains stationary during the balance of the stroke, while the roller 318 is running on the dwell 321. Shaft 308 is rocked back to its normal position in the last part of the return stroke of the main shaft.

When the main shaft 115 is operated by the motor the following mechanism is employed. On the extreme left-hand end of said shaft, Figs. 3 and 12, there is mounted a segmental gear 322, which meshes with a long rack bar 323, which is guided by a grooved roller 324 engaging its lower edge. This rack bar extends to the back of the machine, where it is connected to the wrist-pin 325 of a wheel or spider 326, which makes one complete rotation at each operation of the machine. In the position of rest, the wrist-pin 325 is practically at its forward dead center. This construction gives a harmonic motion to the shaft 115, which is conducive to speed of operation without shock.

The means whereby the type bars 107 are caused to rise, during the forward stroke, and to return to normal position, during the return stroke of the shaft 115, are best shown in Figs. 3, 12 and 44. Just outside of each of the main frame plates 127 and 128 there is mounted on the shaft 115 a cam plate 327 having the outline shown in Figs. 3 and 42. A short distance above the shaft 115 there is a transverse shaft or rod 328 projecting through the main frame plates. On each end thereof is journaled a hub 330 of a lever 331 of the first order, which lever has on its shorter forward arm an anti-friction roller 332 pressed against the periphery of the cam 327 by a spring 333. Each of the levers 327 extends rearward from the shaft 328 and has pivoted to its rear end a link or bar 334, which hangs down just outside the frame plate. Each of these frame plates has a long vertical slot 335, Fig. 4, through which extends a transverse bar 336, which is suitably secured to the two links 334, and which bar extends across the machine above all of the arms 282 of the type bars, as shown in the drawings. The outline of the cam 327 is such that, during the first part of the forward rocking of the main shaft, the parts above described are stationary, the roller 332 riding on a concentric part of the cam. After the necessary preliminary operations have been performed, this roller runs down on the inclined rear edge of the cam and the bar 336 is allowed to rise, partly due to the tension of the two springs 333 and partly to the tension of the several springs 294, which elevate the individual type bars. On the return stroke of the main shaft the levers 327 are forced to rock counterclockwise in Fig. 3, thus forcibly depressing the bar 336 and all of the type bars.

*Mechanism for moving the register wheels into and out of mesh*

The register wheels 112 are mounted on a shaft 340 inserted through holes in the side plates 156 and 157 of the register frame. As said hereinbefore, this frame is mounted in part on the arms 164 fast on the shaft 165, and the register is shifted to its three positions, add, neutral and subtract, by rocking said shaft. Said shaft extends through and some distance to the right of the main side plate 128, and, on its end, it has a forwardly extending arm 341 having a follower roller 342 journaled thereto on a stud (Fig. 19).

A main shifting plate 343 is slidably mounted on the main frame outside of the main frame plate 128 and spaced to the right of the latter somewhat less than an inch. The outline of this plate can be traced in Fig. 15 where it will be seen that it has a wide portion back of the main shaft 115, and a narrower portion projecting forwardly beneath said shaft. It is supported and guided for horizontal sliding motion by two grooved rollers 344 and 345 journaled on posts 346 and 347 projecting a suitable distance from the side plate 128, said rollers engaging in slots in the plate. This plate 343 is shiftable to two positions, viz., a forward normal position shown in most of the drawings, and a rear position. It is yieldingly held in either position by a detent consisting of a roller 348 (Fig. 23) mounted on a spring-pressed arm 350 pivoted on a post 351, said roller engaging in two V-shaped notches 352 in the plate.

The plate 343 has a cam slot or opening 353 into which projects the follower roller 342, which controls the shaft 165 and the register frame. The rear portion of this opening is of such width up and down, that the roller 342 can occupy in it a lower position shown in full lines in Fig. 15 and in which the register wheels will engage the forward or adding racks 113, as shown in Fig. 19, or an upper position, shown in Fig. 15 by broken lines, and in which the register wheels engage the rear or subtraction racks 114. The opening 353 has its forward portion of a width substantially equal to the diameter of the roller 342, and disposed at a middle level, so that, whenever the plate 343 is in its rear position shown in Fig. 17, the roller 342 is forced to its middle position in which the register wheels are positioned midway between the racks 113 and 114 and not in engagement with either.

The movement of the roller 342 from its neutral position, shown in Fig. 17, to its add or subtract position, as the case may be, is controlled by a switch cam 354 pivoted to the plate 343 on a stud 355 about which it can rock to an extent limited by two stop pins 356. This switch consists of a plate lying against the outer face of the plate 343 and having an opening through which the roller 342 passes. Projecting forward from the rear edge of this opening is a pointed cam finger 357. This finger and the opening 353 in the plate 343 are so designed that, when the switch 354 stands in its upper position shown in Fig. 23, the lower edge of the finger and the lower edge of the opening 353 define a cam slot extending first at a downward inclination from the middle neutral position, and thence horizontally rearward; and, when said switch is in its lower position shown in Fig. 16, a cam slot is defined having a forward neutral dwell, then an upward incline, and then a rear dwell. When the plate 343 is in its rear position (Fig. 17), the switch can be swung either up for addition or down for subtraction, and then, when the plate 343 is moved forward, the roller 342 will be cammed down or up as the case may be.

It will be perceived that, whenever the plate 343 is in its rear position, the register wheels are out of mesh with the racks, and, whenever said plate is in its forward position, the wheels are in mesh with either the racks 113 or 114, depending on the setting of the switch 354. Various means may be provided for shifting the plate 343 and these may be controlled in a variety of ways to produce desired operations of the machine. In the present instance the means for shifting the plate comprise three pins or studs projecting rightward from the cam plates 305 and 306, which are fast on the main shaft 115, viz., a comparatively short pin 360 (Fig. 12) and two longer pins 361 and 362. Their operation is illustrated diagrammatically in Figs. 15–18. Figs. 15 and 16 show the main shaft in normal position and Figs. 17 and 18 in its extreme operated position (end of forward stroke). The plate 343 has an ear or lug 363 so disposed that in normal position it stands just in front of the pin 361. The construction is such that, when the main shaft makes its return stroke from the position shown in Fig. 18 to that of Fig. 16, the pin 361 will, in the very last part of such return stroke, strike this lug 363 and force the plate 343 back to its active position. It will be perceived, therefore, that in the specific machine described that, when the main shaft 115 is in normal position, the register wheels are always in engagement. In Fig. 1 the shaft 115 is in normal position and the register wheels are in neutral. In practice, these two things would not occur at the same time, but are shown that way for clarity of illustration of the registering mechanism.

It will be noted in Fig. 17 that the pin 360 has passed to the rear of the front edge of the lug 363. This is the short pin, and said lug is off-set to the right so as not to stand in its path, but so as to be operated by the long pin 361.

In Figs. 15 and 17 the mechanism is shown set for computing operations (addition or sugtraction). In these operations the plate 343 is shifted rearward to move the register wheels out of mesh at the first part of the forward stroke of the main shaft, and forward to throw them into mesh at the first part of the return stroke. The first of these movements is effected by the pin 361 acting on a dog 364 and the second by the pin 360 acting on a dog 365, both dogs pivoted to the shifting plate 343 on a stud 366. The dog 364 is on the outer face of the plate 343 and its end normally stands just back of the pin 361 in about the same plane as the lug 363. This dog can be depressed to the position shown in Fig. 16, where it is out of the path of pin 361 and, therefore, inactive. It is drawn upward by a spring 366 until arrested in normal active position by a stop pin 367. In an adding or subtracting operation, in the first part of the forward stroke of the main shaft, the pin 361, acting on the end of dog 364, pushes the plate 343 to its neutral position, shown in Fig. 17, and the end of the dog then passes out of the circular path of the pin, which moves on free of the dog.

The dog 365 is mounted on the inner face of the plate 343, and its forward end is formed into a hook 368, having an abrupt rear edge, and an inclined forward edge, and in a plane where it can be reached by the short pin 360. In the last part of the forward stroke of the main shaft said pin 360 strikes the inclined edge of the hook 368, depressing it momentarily and then escapes beyond it, as shown in Fig. 17. In the first part of the return stroke, the pin 360 engages the abrupt rear face of hook 368 and draws the plate 343 forward to its active position, the hook 368 then passing out of the path of the pin. The dog 365 is drawn upward by a spring 370 against a stop pin 371 (Fig. 17). At its forward end it is guided by a groved stud, projecting from the plate 343, so as to space it properly from said plate, said stud lying in a slot in the dog.

In total taking operations use is made of a third dog 373, pivoted at 374 to the upper part of the plate 343, and extending forward from said pivot. This dog is urged downward by the spring 366 to the position shown in Fig. 16, where it is arrested by a stop pin 375, and where its free end is in the path of motion of the pin 362. In computing operations this dog is held in its upper position, shown in Figs. 15 and 17, where it is out of the path of said pin.

In Figs. 16 and 18 the dogs are shown set in position to take a total (with clearing). The dog 373 has been allowed to drop down to its operative position and the dogs 364 and 365 have been depressed to inoperative position out of the paths of the pins 361 and 360. Since the roller 342 is in its upper position in these figures, the machine is set for taking a negative total, the register wheels being initially in mesh with the subtracting racks 114. Since the dog 364 is out of the path of the pin 361, when the main shaft is rocked to the position, shown in Fig. 18, the shifting plate 343 will remain in its active positon and the register wheels will, therefore, remain in mesh with the racks during the upward motion of the latter. During this motion the pin 362 snaps under the dog 373, which drops down behind it, as shown in Fig. 18. In the first part of the return stroke, therefore, this pin, acting on the dog 373, will push the shifting plate to its rear or neutral position, leaving the register wheels out of mesh with the racks during the return stroke of the latter. At the end of the return motion, the pin 361, engaging the lug 363, will draw the plate 343 back to its active position. As will appear hereinafter, the switch 354 will meanwhile have snapped back to its adding position so that, when the wheels are thrown into mesh at the end of the cycle, they will move into mesh with the adding racks.

It will be noted that, when the pins act on the dogs 364 and 373, the friction of the pins across the ends of the dogs tend to press the latter back against their stops 367 and 375, which stops prevent the dogs from following the pins so that the latter escape from the ends of the dogs and proceed on their way.

In the total taking operation, just above described, if the dog 365 had been in its upper active position, the pin 360, engaging it early in the return stroke of the main shaft, would have endeavored to draw the plate 343 forward in opposition to the pin 373. It is therefore necessary that ths dog 365 be in its depressed position during this operation.

The cooperating mechanism, involved in this total taking operation, is shown in Fig. 19 in the position it occupies, after the total key has been set, and before the main shaft has been rocked, but in this figure the machine indicates a positive total.

In Fig. 20 the parts are shown set for a total taking operation, and in the position they occupy early in the return stroke of the main shaft 115. Here the pin 362 has a little more than half completed the pushing of the dog 373 and plate 343 back to their neutral position. By the time the plate is entirely back, the pin in its circular motion will pass off of the end of the dog, leaving the register wheels out of mesh for the return stroke of the racks.

In order to take a sub-total, the dogs 364, 365 and 373 are all three set in inoperative position as shown in Fig. 23, with the result that, when the main shaft is rocked, the shifting plate 343 remains in its normal active position throughout the entire cycle, the register wheels remaining in mesh with the racks, during both the upward and downward motions of the latter, so that the total is printed and immediately rolled back into the wheels.

It may be said, however, that in this operation it is immaterial whether the dog 365 be in its operative or in its inoperative position. As the plate 343 is already in its active position this dog would be inoperative even if it stood in its normal upper position.

In Fig. 24 the dogs are shown set for a non-add operation. In this figure the main shaft 115 has been rocked forward and most of the way back. The only change from normal setting for this operation is to depress the dog 365 to inoperative position. The dog 364, being in normal position the plate 343 was pushed back to neutral position at the first part of the forward stroke of the shaft. Since the restoring dog 365 was depressed to inactive position the plate remained in that position during the return stroke of the shaft up to nearly the end thereof. In Fig. 24 the pin 361 is shown only a short distance from its home position, and in the act of engaging the lug 363 and drawing the plate 343 back to its normal active position. This takes place at the extreme end of the return stroke and after the type bars and racks have all been restored to normal position. It will be perceived that in this operation the register wheels were out of mesh with the racks during both the forward and return strokes of the latter and that, therefore, a number set up on the stop carriage was printed, but not added.

The conditions for the various operations are therefore as follows: Adding or subtracting, dogs 364 and 365 active, dog 373 inactive. Total (with clearing), dogs 364 and 365 inactive, dog 373 active. Sub-total, dogs 364 and 373 inactive. Non-add, dog 364 active, dog 365 inactive.

*Total and sub-total mechanism*

The total and sub-total key 124 consists of a lever pivoted at the right of the keyboard on a stud or post 380 projecting rightward from the right-hand side plate 142 of the keyboard section of the machine. When this lever occupies the normal middle position, shown in Fig. 2, the machine is not set for total taking. When the key is pushed to its rear position, shown in Fig. 19, it sets the mechanism to take a total with clearing, and, when pulled to its forward position, shown in Fig. 23, it sets the mechanism to take a sub-total. As shown in the latter figure, there are pivoted on the stud 380 two centering levers 381, drawn together by a spring 382, and when so drawn together, as shown in Fig. 2, they pinch between them a stud 383 projecting leftward from the lever 124 and also a fixed stud 384. The lever is locked in either of its two set positions by means of a latch lever 385 having an ear 386 bent off therefrom in position to engage either one of two lugs or teeth 387 and 388 projecting from the lower end of the lever 124. The latch lever 385 is controlled by a spring 390. The construction is such that the lever may be moved to either of its two set positions and it will be retained there by the latch lever 385, until at the proper point in the total taking cycle this latch lever is released, whereupon the key will be returned to its middle position by the spring 382. The stud 383 also projects outwardly from the lower arm of the lever 124 and it has pivoted thereon a sliding link 391, whose shape and mounting are perhaps best shown in Fig. 19. This link extends rearwardly and it has a guide slot 392 by which it is suitably guided on a stud 393, Figs. 19 and 21, projecting rightward from the main frame plate 128 (leftward in Fig. 21, which is a section looking toward the front of the machine). The link 391 has forward of the stud 393 an upwardly projecting finger 394, and to the rear of said stud a downwardly projecting finger 395. Pivoted on the stud 393, Figs. 19, 20, and 21, are an inner bail 396 and an outer bail 397, the former nested within the latter, and the link 391 being between the pivoted arms of the bails. The finger 395 hangs down behind the cross bar of the outer bail 397 so that, when the key 124 is moved to its rear or total taking position, and the link 391 is thereby drawn toward the front of the machine, this finger will rock said bail clockwise, as shown in Figs. 19 and 20. When, however, this key is pulled to its forward sub-total position, as shown in Fig. 23, the upper finger 394 thereof acts on a stud 398 projecting from an upwardly extending arm of the inner bail 396, and rocks said inner bail clockwise, but does not rock the outer bail. The outer bail 397 has a rearwardly extending arm 400 to which is pivoted the lower end of an upright link 401, the upper end of which has a vertical slot by which the link is guided for up and down motion on a post 402 projecting rightward from the frame plate 128.

The inner bail 396 has its right-hand arm prolonged rearward into an arm 403 to the rear end of which is pivoted another vertical sliding link 404, having in its upper part a vertical slot 405 by which it is guided on a pin 406 projecting inward from the link 401. This pin normally stands at the bottom of the slot, so that, when the link 401 is drawn down for total-taking, it draws the link 404 down also. The link 404 also has a pin 407 projecting inward therefrom and overlying the two dogs 364 and 365. The upper pin 406 on the link 401 underlies the upper dog 373. The two bails 396 and 397 are controlled by two springs 408 (Fig. 23), which tend to hold the links 401 and 404 in their upper positions limited, respectively, by the post 402 and the stud 406. The parts are shown in normal position in Fig. 2, where the upper stud 406 is holding the upper dog 373 in inoperative position, and where the lower stud 407 is out of contact with the dogs 364 and 365, allowing these dogs, therefore, to occupy their operative positions. The mechanism is, therefore, set for computing operations, the plate 343 being pushed rearward to its neutral position by the dog 364 in the first part of the forward stroke of the main shaft and returned to active position by the dog 365 in the first part of the return motion of the shaft as above described.

When the total key 124 is pushed to its rear position, shown in Fig. 19, both slides 401 and 404 are pulled downward with the result that the pin 406 permits the upper dog 373 to drop to operative position and the pin 407 depresses the two dogs 364 and 365 to inoperative position. This is the setting for taking a total, as above described. The register wheels are already in mesh, and on the forward stroke of the main shaft they will remain in mesh because the dog 364 is in inoperative position. During this stroke the pin 362 will deflect the dog 373 which at the end of the stroke will drop in behind it so that, at the first part of the return stroke this pin, acting on said dog, will restore the shifting plate 343 to its neutral position; the register wheels will then be at zero and will so remain.

When the total key 124 is drawn forward to take a sub-total, as shown in Fig. 23, only the inner bail 396 is rocked, the outer bail 397 remaining in normal position. The inner slide 404, will, therefore, be pulled down, but not the outer slide 401. The pin 406 will, therefore, continue to hold the upper dog 373 in its inoperative position, but the lower pin 407 will depress both dogs 364 and 365 to inoperative position. This is the condition for a sub-total, as above described. The register wheels are already in mesh with the racks and they will remain so throughout the cycle, all of the shifting dogs being inoperative.

Means are provided to withdraw the zero stop plate 245 to inoperative position both in taking a total and in taking a sub-total. It will be recalled that, in both of these operations, the inner bail 396 is rocked clockwise. As best shown in Figs. 20, 21 and 22, the left-hand arm of this bail has a nose 410 across the upper edge of which lies a pin 411 projecting from a rocking piece 412, which is pivoted on the post 393, just to the left of the two bails 396 and 397. This pivoted piece 412 is connected with the inner bail 396 by a tension spring 413 so that, when the bail is rocked, this spring tends to cause the piece 412 to rock with it. Said piece 412 is forked and into the fork a pin 414 projects from an arm 415 fast on the end of a square rock shaft 416, which is journaled at its right-hand end in the frame plate 128, and which extends across the machine just in front of the dog rocker 260, as shown in Fig. 8, the left-hand end of the shaft being journaled in the left-hand frame plate 127. This square shaft has mounted on it a sheet metal arm 417, the upper end of which, when the stop carriage is in retracted position, lies just behind the lip 253, which projects downward from the front end of the sliding zero stop 245. The construction is such that, when the bail 396 is rocked clockwise in Fig. 20, as it is both in total taking and sub-total taking operations, the shaft 416 is rocked counterclockwise and the arm 417 pulls the zero stop 245 out of the way of the type bars, so that the latter can rise under the control of the register wheels after the usual fashion of total taking. As will appear hereinafter the total key is released to return to its middle position in the last part of the return stroke of the shaft 115, and after the type bars have been restored to their normal position. When this key does return to normal, the shaft 416, and the zero stop 245, also return to normal.

The spring 413 is interposed in the above train of mechanism, because it is desirable that the zero stop be pulled back until arrested by engaging the forward plate 225 of the stop carriage. The mechanism would impart more motion to the arm 417 than is necessary for this purpose, so that this spring is stretched in the latter part of the rocking of bail 396.

*Non-add*

The non-add key 122 and its connections are shown in Figs. 6, 24, and 25. As shown in Fig. 6, the stem 425 of this key has a pin 426 projecting leftward therefrom behind the rear edge of the frame plate 141 and between the branches of the forked end of an arm fixed on the left end of a long rock shaft 427, which (Figs. 1, 24 and 25) projects through and beyond the right-hand frame plate 142 where it has mounted thereon a rearwardly extending arm 428. Said arm 428 has a pin 430 projecting rightwardly therefrom and overlying a shelf or flange 431 bent leftward from the lower part of the forward end of the dog 365. The construction is such that, when the key 122 is depressed, the shaft 427 and arm 428 are rocked clockwise in Fig. 24, the pin 430 acting on the flange 431 draws the restoring dog 365 down to its inoperative position, as shown in Fig. 24. The length of the flange 431 is such that said flange remains beneath the pin 430 during the reciprocations of the dog 365 with the plate 343. The depression of this key, therefore, withdraws the dog 365 to inoperative position, leaving the dog 364 in its operative position and 373 in its inoperative position. When, therefore, the main shaft takes its forward stroke, the pin 361, acting on the dog 364, immediately moves the shifting plate 343 to its rear inactive position, and, since the dog 365 is inoperative, the plate 343 will remain in that position throughout the entire cycle, until it is returned by the pin 361, acting on the lug 363 at the extreme last part of the return stroke of the main shaft. In Fig. 24, the parts are shown at this stage of the operation. That is to say the register wheels are out of mesh, but the pin 361, which has nearly completed its return excursion is about to restore the register wheels to engagement. During this cycle the type bars 107 are free to move upward and the number set up on the stop carriage to be printed, but the register wheels will not be affected.

*Register and transfer mechanism*

In the specific machine illustrated in the drawings, the register wheels 112 have twenty teeth each (Figs. 1 and 26), and are of 30 diametral pitch. Each of them has at its left-hand side the usual two transfer teeth 435 usually made by stamping up a thickened part of the wheel terminating at each end in a tooth integral with one of the gear teeth of the register wheel.

The transfer mechanism comprises a series of dogs 436, each pivoted at 437 to a horizontal lever 438 of the first order, said levers being pivoted on a shaft or rod 440 mounted in the two side plates 156 and 157 of the register frame, guided in the double comb plate 158, and urged clockwise in Fig. 1 by a tension spring 442 which, at its lower end, is connected to a cross rod 443 mounted in the two side plates 156 and 157, the tension of these springs tending to move the dogs 436 upward radially of the wheels. The rear arm of each lever 438 has pivoted thereto the upper end of a long link 444 which, at its lower end at 445, is pivoted to the rear end of the horizontal arm 446 of a bell crank, all of said bell cranks being pivoted side by side on a cross rod 447 supported by the main side plate 127 and 128 and guided by comb plates 432 and 433 (Fig. 1). The upstanding arms 448 of said bell cranks have their upper ends adapted to act as stops for brackets 450, each said bracket being mounted on the right-hand face of one of the rack bars 111. Each of the lever arms 448 has a shoulder 451 situated below the extreme end of the lever, a distance equal to one tooth space of the rack. The whole construction is such that, when one of the dogs 436 is released, as presently to be described and allowed to be moved upward by its spring 442, the upper end of the lever arm 441 will be swung rearward out of the path of bracket 450 and allow the racks 113 and 114 to drop down a tooth-space beyond normal until arrested on the shoulder 451. It will be recognized that this transfer mechanism works on the known general principle of allowing to the actuating rack an extra step of movement in case of transfer.

Each of the dogs 436 has a long up and down cut-out 452, the dog below such cut-out projecting downward in the form of a tooth 453, which tooth, when the dog is in normal position, lies in the path of the transfer teeth 435 of the associated register wheel. A comb plate 454 extends through the series of cut-outs 452 in the dogs and is supported at its ends in a manner to be presently described. The teeth of this comb plate project downward, and the portion of each dog 436 below the cut-out 452 is guided in a slot of this comb plate. The tooth 453 has stamped up from its right-hand face a lug 455 which, when the dog is in its normal position, lies geneath the end of one of the teeth of the comb 454, which comb-tooth thus acts as a stop for the dog, and it is this which normally prevents the upward motion of the dog under the pressure of the spring 442. The width of the cut-out 452 is such that, if the wheel 112 is turning counter-clockwise in Fig. 26 in an adding operation and the transfer tooth 435 strikes the tooth 453 of the dog, said dog will be swung toward the front of the machine about its pivot 437. This will move the lug 455 out from under the comb tooth and permit the dog 436 to move upward, its lug 455 sliding up the front surface of the comb-tooth; swinging the bell crank 446, 448 clockwise in Fig. 1, and thus effecting a transfer to the next rack and wheel to the left. Also, if, when the register wheel is turning clockwise in subtraction, one of the transfer teeth passes the tooth 453, it will throw said tooth rearward, which motion will also move the lug 455 from beneath the comb tooth and permit a transfer the same as before, said lug sliding up the rear surface of the comb-tooth. It will be perceived that the transfer tooth 435 does not have a camming action on the dog but merely pushes the latter free of its stop, the action of said tooth on said dog being like that of one gear tooth on another.

It will be understood that the levers 438 are mounted in the register frame, which has a shifting movement front and back, whereas the bell cranks 446, 448 are pivoted in the main frame. During the shifting movements of the register frame, the links 444 swing about their lower pivots 445 as a center.

Unless means to the contrary were provided, the hold of the lug 455 on the lower end of the tooth of the comb 454 would be a precarious one. Also, in total taking the transfer tooth 435 must be arrested by the tooth 453. Settable abutments for the dogs are, therefore, provided, consisting of two cross bars 456 and 457, one extending in front of, and the other behind, all of the dog teeth 453 with sufficient space between them to permit of the necessary swinging motion of the dogs. As will be explained hereinafter, these cross bars extend through horizontal slots 458 in the frame plates 156 and 157, and they are shiftable to two positions. When the machine is set for addition, as shown in Fig. 26, the rear bar 457 is in contact with the rear edges of all of the teeth 453, whereas, when the machine is set for subtraction, these bars are shifted rearward so that the bar 456 is in contact with the forward edges of all of the teeth 453. Thus, when the machine is set for addition, the dogs 436 can swing forward, but not rearward, and vice versa when the machine is set for subtraction. Also, each of the dogs 436 is prolonged above its pivot, where it is influenced by a spring 460. These springs are all hooked to a bail 461 (Figs. 1 and 31), the arms of which are pivoted to the side plates 156 and 157. When the machine is set for addition this bail is inclined toward the front of the machine, so that, as shown in Fig. 26, the springs 460 pull the upper ends of the dog 436 forwardly and tend to swing their lower ends rearward, thus pressing their teeth 453 against the cross bar 457. When, however, the machine is set for subtraction this bail is swung rearward causing all of the springs 460 to exert their tension in a rearward direction, thus pressing the teeth 453 against the cross bar 456. When one of the dogs is tripped to effect a transfer it moves upward until arrested by suitable means, such as the comb 432.

In taking a positive total the wheels are set as in Fig. 26 and they turn clockwise, so that, when the transfer tooth 435 strikes the dog tooth 453, the latter is prevented from motion in that direction by the bar 457 and the wheel is, therefore, arrested at zero. Also in taking a negative total the wheels would turn counterclockwise and would be arrested at their negative zero positions by a tooth 435 striking a tooth 453, which is then held against displacement by the bar 456.

Means for re-setting the transfer mechanism after the operation thereof are shown in Figs. 31, 33 and 34.

Referring to Fig. 26 a transfer operation would cause the dog 436 to be deflected leftward in that figure, and the lug or block 455 would move upward, sliding along the left-hand surface of the comb tooth, said block being pressed against said tooth by the tension of the spring 460. The parts will be restored to normal position, if the comb plate 454 be moved bodily upward, until the lower edge of the tooth reaches a height above the upper position of the block 455. The spring 460 will then cause the dog to snap toward the right, until arrested by the bar 457. If then the comb 454 be depressed to its normal position, it will pull the dog downward and restore all of the parts of the transfer mechanism to normal. This operation is performed in computing operations during the forward stroke of the main shaft, at which time, the register wheels are out of mesh.

On the main shaft 115 there is mounted an arm 463, Fig. 33, to which a link 464 is pivoted on a stud 465 of said arm, which stud projects into a slot in the link to afford a slight lost motion. The link 464 is pivoted at 466, Figs. 33 and 34 to a sliding cam plate 467, which has two guide slots 468 and 470 by which it is guided on two studs 471 and 472 projecting leftward from the right-hand main frame plate 128. This plate 467 is, therefore, situated between the main side plate 128 and the right-hand side plate 157 of the register frame. The construction is such that on the forward stroke of the main shaft the cam plate 467 slides some distance toward the front of the machine and slides back during the return stroke. This plate has therein a cam slot 473 in which plays a follower roller 474. The upper edge of this slot extends first horizontally, then upward at an inclination, thence a short distance horizontally, thence downward at an inclination, thence horizontally. A cam plate or dog 475, Fig. 34, is pivoted to the plates 467 and 476 and its motion clockwise about said pivot is limited by a stop 477. The upper edge of this dog is so shaped that, when the dog is in normal position, shown in the drawings, it supplies the lower edge of a cam slot in the plate 467, said slot being of a width about equal to the diameter of the roller 474. The whole construction is such that, when the plate 467 is drawn forward, the plate 475 remains in normal position because it is arrested by the stop 477. The roller, therefore, is for a moment quiescent, then moves upward, and then downward into a dwell at the right-hand end of the slot. On the return stroke the plate 475 yields about its pivot and allows the roller 474 to remain stationary during the return stroke, except as will be hereinafter mentioned. This roller 474 is connected to the comb plate 454 by the following means: Said roller is journaled on a stud projecting leftward from a lever arm 478 (Fig. 33) pivoted to the outside face of the frame plate 128, the roller projecting through a slot 480 in said plate. The arm 478 is connected by a link 481 with an arm 482 fixed to and projecting forward from a rock shaft 483 which is journaled in the two side plates 127 and 128. The shaft 483 has mounted thereon two arms 484 (Fig. 31) to each of which is pivoted a link 485 extending upward, one of these links being at the right-hand side of the right-hand register frame plate 157, and the other at the left-hand side of the left-hand register frame plate 156. In other words, these two links come up on the outsides of the register frame. Each of them at its upper end is pivoted at 486 to a slide 487, which slide has at its upper end a slot 488 by which it is guided on the stud 490 on which the bail 461 is pivoted. At its lower end the slide bar 487 has an open ended slot, which is guided by a headed stud 491 projecting from the side plate of the register frame. The ends of the comb plate 454 project through openings in the side plate of the register frame and are secured in these sliding bars 487, as shown in Fig. 31. It will be perceived that on the forward stroke of the main shaft 115 this comb plate 454 will move first upward to allow any displaced transfer dog 436 to snap in under it, and will then be depressed to its lower position, thus re-setting the dogs 436, the levers 438, links 444 and transfer bell cranks 446, 448.

The cam plate 475 is restored to and held in normal position by a spring. For reasons which will presently appear this is effected in the following manner: Said plate 475 has a stud 492 projecting therefrom into a long slot 493 in a lever arm 494, which is pivoted on the inside of the frame plate 128 at 495. A rear arm of this lever is drawn downward by a spring 496 which, acting through the stud 492, controls the plate 475. This stud slides in the slot 493 during the sliding motion of the plate 467.

It will be noted in Fig. 34 that the right-hand end of the cam slot 473 stands at a slightly lower level than the left-hand end of said slot so that the comb plate 454 stands a little higher, when the shaft 115 is in normal position, than it does at and near the end of the forward stroke of said shaft. The reason for this is as follows: The lower end of the dog tooth 453 is somewhat tapered and in the normal position of said tooth, shown in Fig. 26 and in the nine and zero positions of the transfer tooth 435, there is a slight clearance between these two teeth. This is of some importance as otherwise a slight overthrow of a register wheel, when it should be arrested in the nine position, might cause the tooth 435 to strike the tooth 453 a blow, which would knock said tooth and the dog 436 free from the comb 454, and cause a transfer when the register wheel did not pass from nine to zero. This clearance is, however, a disadvantage when the tooth 453 is used to arrest the register wheel at zero position at total taking. In that operation the wheel, the rack and the type bar, should be arrested with a degree of precision, which would be spoiled by looseness at the point indicated. The printing of the total takes place about the beginning of the return stroke of the main shaft, at which time the cam plate 467 is in its forward position, and the roller 474 occupies the right-hand end of the slot 473 in Fig. 34, and the comb plate 454 and all of the transfer dogs are, therefore, pushed downward lower than they are shown in Fig. 26 so as to take up some of the clearance or lost motion, above described, and so as to arrest the type bars more exactly in proper position. Additional means for taking up this clearance will be described hereinafter.

In a total taking operation the register wheels are in mesh during the forward stroke of the main shaft, and it is necessary that the dogs 436 be standing in position to arrest them, and it is, therefore, necessary that the dogs be not raised during the forward stroke of the main shaft in that operation. In a total taking operation, therefore, the plate 475 is swung downward about its pivot 476 out of the path of the roller 474, so that it does not act to elevate said roller. This is effected by the following means: It will be recalled that, during both total taking and sub-total taking operations, the slide 404 occupies a depressed position shown, for example, in Fig. 19. This slide is made with a rearwardly projecting arm or extension 496, which has a stud 497 projecting into a slot in the end of a lever 498, which is pivoted on the outer end of the post 346 which, among other things, serves as one of the guides for the shifting plate 343. At its rear end this lever has a stud 500 projecting into a slot in a cam plate 501, a portion of which is made bail-shaped so as to give it a two point bearing on the shaft 308 at the rear of the machine. This cam plate 501 normally stands in the position shown in Fig. 33, but when the total key 124 is set, either for taking a total or for taking a sub-total, the parts just described are rocked to the positions shown, for example in Fig. 19. The cam plate 501 controls a follower roller 502 mounted on a lever 503 which is pivoted on a stud 504, projecting rightward from the right-hand frame plate 128. This lever is of somewhat complicated shape which can, however, be readily understood from the drawings. It is pivoted on the stud at two points, its upwardly extending arm being near the end of the stud and its downwardly extending arm near the plate 128 and the two arms being connected by a bail bar 505. The depending arm of the lever 503 is offset at 506, Figs. 33 and 34, this offset portion extending through a slot 507 in the frame plate 128, so that the extreme lower end of the lever extends inside of the frame plate as shown in Fig. 33. The lever 494 is also pivoted on its stud 495 at two points connected by a bail bar 508 and the outer branch of this lever includes an arm 510 which lies in the path of motion of the horizontal offset portion 506 of the lever 503. The whole construction is such that when the plate 501 is rocked by the operation of the total key the lever 503 swings counterclockwise in Figs. 33 and 34, and the portion 506 thereof striking the lever arm 510, rocks the lever 494 counterclockwise to a position where its slot 493 is about horizontal and where it rocks the cam plate 475 out of the path of the follower roller 474. During the total taking operation, therefore, there is nothing to force the comb plate 454 to its upper position.

However, the tension of all of the springs 442 of the transfer mechanism tends to raise this plate and it is, therefore, necessary positively to hold it down at certain times. To this end the following means are provided: the shifting plate 343 has bent off from the lower portion of the rear edge thereof an ear 511 as best shown in Fig. 30. This ear is bent first toward the left and then toward the front of the machine so that the active part of it is in the plane of a roller 512, journaled on the end of the rocking arm 482, as best shown in Fig. 33 where the ear 511 is also shown. The lower edge of this ear is made of truncated V-shape so as to act as a cam on said roller and to hold it down whenever the plate 343 is in its forward position, which it is at two of the times when it is desired that the comb 454 is held down, namely, during the forward operating stroke in total-taking operations and during the return stroke in computing operations.

During the return stroke in total-taking operations the plate 343 occupies its rear position, and the cam ear 511 is, therefore, not over the roller 512. In order to prevent the upward motion of the comb plate at that time, the following means are provided. The arm 482 has an ear 513 bent off leftward from its lower edge so as to serve as a flange or shelf, and a locking dog 514, Figs. 33 and 35, is pivoted to the frame plate 128 on a stud 515. This dog has a forwardly directed arm to which is attached a spring 516, which tends to hold the dog out of engagement with the flange 513. The stud 477, Fig. 34, which is mounted on the cam slide 467, projects through the opening 480 in the plate 128, and as this stud moves toward the front of the machine, it engages a cam portion 517 on the dog 514 and rocks it against the tension of its spring into position to block the upward motion of the flange 513. A latch lever 518 is pivoted on the shaft 165 and its forwardly extending end drawn downward by a spring 520. This latch lever has an upwardly extending arm which, when the parts are returning to normal position, is struck by the stud 477 and the latch is thereby rocked counterclockwise against its spring 520. As soon as the slide 467 and its stud 477 begin their forward movement this lever is allowed to drop down, and when the locking dog 514 is moved to its operating position, it is locked there by the latch engaging an ear 521 of said lever. The dog 514, therefore, locks the comb plate 454 in its lower position during every return stroke of the main shaft. At the end of the return stroke the stud 477 releases the latch 518 and the latch 514 is then drawn to releasing position by its spring 516. In order to insure the releasing of the latch 514 the latch 518 is prolonged forward, and its forward end is adapted to strike a stud 522 on the latch 514 and positively move the latter out of engagement.

The whole construction is such that, in computing operations in the first part of the forward stroke of the main shaft, the register wheels are moved to their middle inactive position, after which the comb plate 454 is moved upward so as to allow any displaced dogs 436 to snap back into engagement with it, and it is then moved downward to a position a little below its normal position. Early in the return stroke of the main shaft the comb plate makes a slight upward motion to its normal position, where it remains during the balance of the cycle. In total taking operations the comb plate is held in its normal position by the cam ear 511 during most of the forward stroke of the main shaft, is then slightly depressed and, early in the return stroke of the handle, returns slightly upward to its normal position where it remains during the balance of the cycle.

An aligning bar 525, Figs. 1 and 30, moves into engagement with the register wheels whenever the latter move out of mesh and out of engagement when they move into mesh. This bar is in the nature of a bail, whose arms 526 are pivoted on the outside of the frame plate 156 and 157 of the register frame on the projecting ends of a cross shaft or rod 527, and they are drawn upward to move the aligning bar into mesh with the wheels by springs 528. One of the arms 526 is extended rearward and is connected by a link 530 with a lever arm 531 pivoted to the outside of the right-hand frame plate 128 on a stud or post 532. The free end of this arm is bent leftward through an opening in the frame plate 128, and the link 530 is pivoted to an ear bent up from this leftward extension. This lever is in the nature of a bell crank whose horizontal arm is near the frame plate 128, and whose upstanding arm 533, Fig. 30, is nearer to the shifting plate 343, the two arms being connected by a bail bar 534. A stud 535 on the shifting plate 343 is adapted when said plate is moved toward the front of the machine to rock the lever arm 533 forward, and the lever arm 531 upward, and thus to move the aligning bar 525 out of engagement with the wheels. When the shifting plate is moved to its rear position, the stud 535 moves away from the lever arm and permits the springs to move the aligning bar into engagement. It will be noted that these movements of the aligning bar require for their performance only that small part of the shifting movement of the plate 343 in which the follower roller 512, which shifts the register, is still in the dwell at the end of its cam slot, so that the aligning bar moves into the wheels while the latter are still in mesh with their racks, and remains in engagement until they have been re-engaged. As the plate 343 is always in its forward position, when the wheels are in engagement, and in its rear position, when they are out of engagement, it shifts the aligning bar at the proper time.

*Subtraction*

From the foregoing description it will be understood that, in order to set the machine for a subtracting operation, it is necessary to do three things, viz:

(a) The switch 354 must be swung to its lower position shown in Fig. 16. This will result in the register wheels being drawn into mesh with the subtraction racks 114 instead of the addition racks 113.

(b) The bars 456 and 457 must be slid rearward from the adding position shown in Fig. 26 to the subtracting position.

(c) The bail 451 must be swung rearward from the position shown in Fig. 31 to reverse the action of the springs 460 on the dogs 436.

In the present machine these things are done in computing operations by the operating mechanism under the control of the subtraction key 121. This key (Fig. 38) has its stem 540 guided like the other stems in the top plate 143 and bottom plate 144 of the key-board section at the extreme right-hand part of the keyboard as indicated by the mark (—) in Fig. 5. Beneath the keyboard section a transverse shaft 541 is supported by the main frame plates 127 and 128. On this shaft there is pivoted a lever consisting of a long outer arm 542 and a shorter inner arm 543 connected by a bail bar 544 (Fig. 6).

Said inner arm has a stud 545 lying beneath the end of the key stem 540 and by which, when the key is depressed, the lever arms are swung downward against the tension of a spring 546. The arm 543 abuts the under side of the frame plate 144 to limit the upward motion of the arms. The arm 542 at its rear end has a stud 547 on which rests the prolonged end of a pawl or hook 548, which is pivoted at 550 to an arm 551, depending from and fast on the rock shaft 308 and influenced by a spring 552. As explained under the title "Main operating mechanism," this shaft is rocked counterclockwise in Fig. 38 in the first part of the forward stroke of the main shaft 115, and remains in rocked position until it is restored in the last part of the return stroke of the main shaft. This oscillation merely causes the hook 448 to rub back and forth over the stud 457 when the latter is in normal position.

The switch 354 has a stud 553 projecting therefrom through a slot 554 in the shifting plate 343, and a tension spring 555 connectes this stud with a stud 556 on an arm 557, which is pivoted on a post 558, projecting from the main frame plate 128 and normally holds the switch 354 in its upper or add position. The arm 557 is part of a pivoted device consisting of two layers connected by a bail bar, said arm lying a little to the left of the shifting plate 343 and the other layer lying adjacent to the side plate 128 and being in the nature of a gear sector 560. The latter meshes with another gear sector 561 constituting a part of another piece pivoted at 562 on a post projecting from the side plate 128. This device is also made in the form of a bail, its outer arm 563 having an ear 564 bent off therefrom and lying beneath the hook 548. This device is drawn counterclockwise in Fig. 38 by a spring 565 against a stop 566. The construction is such that when the subtraction key 121 is depressed, the hook 548 drops down until it rests on the ear 564. When, in the first part of the forward stroke of the main shaft, the arm 551 moves rearward, said hook rocks the device 563, 561 clockwise and the device 560, 667 counterclockwise. The parts are shown in Fig. 38 in adding position, with the spring 555, drawing the switch 354 against the upper stop 356; but when the arm 557 is swung counterclockwise, the spring pulls downward and tends to swing the switch down against the lower stop 356, as shown in Fig. 16. The switch will swing down as soon as, in the rearward motion of the shifting plate 343, the roller 342 is out of the way. When, in the return stroke of the main shaft, the plate 343 is moved forward to its active position the roller 342 will enter the upper branch of the switch and move the register wheels into mesh with the subtracting racks 114.

In order to shift the bars 456 and 457 (Figs. 26, 36 and 37) and to shift the bail 461, a special cam plate 570 is provided (Figs. 32 and 38). This plate is mounted for sliding motion front and back, its forward end being forked and embracing an anti-friction guide roller 571 on the main shaft 115, and its rear end running between two guide rollers 572 on posts projecting from the frame plate 128. A forked actuating dog 573 is pivoted to the plate 570 at 574 and its rocking motion is guided and limited by a headed stud 575 playing in a slot in the plate. A two-armed device or plate 576, fast on the main shaft 115, has two studs 577 and 578 projecting into the plane of the dog 573. Said dog has an arm 580 which is connected by a link 581 with a portion of the gear sector 561. The construction is such that, when said sector stands in the addition position shown in Fig. 38, the abrupt end 582 of the lower fork of the dog 573 is in the path of movement of the stud 577, but, when in a subtraction operation the sector 561 is swung clockwise, the dog 573 is swung counterclockwise, bringing a hook 583 of the upper arm of said dog into the path of the stud 578, which, in the latter part of the forward motion of the main shaft, will pull the slide 570 to its forward or subtraction position. As will appear hereinafter, the subtraction key is automatically released and returns to normal position in the last part of the return stroke of the operating shaft. As hereinbefore explained, the arm 551 and hook 548 move forward to normal position near the end of such return motion, thus releasing the parts of the action of the spring 565, which will return the spring 555 and dog 573 to normal position. However, the studs 577 and 578 are already nearly to normal position, so that the slide 570 will remain in subtraction position until the next operation of the machine in which, if it be an adding operation, the stud 577 will strike the abrupt end 582 of the dog and push the plate back to addition position in the latter portion of the forward stroke of the shaft 115. It will be noted that the shifting of the plate 570 takes place on the forward stroke of the shaft 115 and never in a total-taking operation. It therefore takes place only when the register wheels are out of mesh.

As shown in Fig. 32 the cam plate 570 has a cam edge, including an upper horizontal dwell 584, a downward incline 585, and a lower horizontal dwell 586, the latter two positions being covered by a similarly formed cam finger 587. The cam thus constructed controls a follower roller 588 mounted on an arm 590 fixed to a transverse rock shaft 591 journaled in the side plates of the register frame. Said shaft projects through a cut-out (Fig. 33) in the side plate 128, outside of which the arm 590 is situated. The construction is such that, when the plate 570 is moved to subtraction position, the shaft 591 is rocked counterclockwise. The dwells 584 and 586 are such that in either position of the plate 570, the roller 588 can move along them when the register is shifted into and out of mesh, without affecting the shaft 591.

As best shown in Fig. 31, the shaft 591 has fixed thereon a gear sector 592, meshing with a pinion 593 fixed to one of the arms of the spring-holding bail 461, whereby said bail is swung clockwise to subtraction position when the plate 570 is drawn forward and back to addition position when said plate is pushed rearward.

Said shaft 591 also has at each side of the register frame a depending arm 594 which arms shift the bars 456 and 457 hereinbefore referred to. Each of said bars has the cross-section shown in Fig. 26, but at each end it is widened out as shown in Fig. 36, those ends sliding in guide slots 595 and 596, Fig. 4, in the side plates 156 and 157, the adjacent ends of said slots being separated by a sort of bar or spacer 597. At each end the two bars 456 and 457 are connected by a tension spring 598 passing through holes in the bars and secured to pins 600 seated in notches in the bars. Each of said bars has its reduced ends 601 projecting through the register side plates and through controlling sliding plates 602 sliding on rollers 603 on the side plate 156 and 157. Each plate 602 has two openings 604 and 605 into which respectively the bars 456 and 457 extend, said openings being separated by a spacer or bar 606 of the slide. Said slide also has an opening 607 into which a stud 608 projects from the arm 594, the side plates 156 and 157 having cut-outs 610 for said studs. The construction is such as to have the following mode of operation: The parts are shown in Figs. 36 and 37 set for addition. The stud 608 is pressing the slide 602 firmly leftward, bringing the bar 457 into contact with the spacer 597. The spacer 606 is holding the bar 456 away, against the tension of the springs 598. When, in a subtracting operation, the arm 594 swings to the right, the springs 598 will cause the bar 456 and slides 602 to follow the stud 608 until said bar is arrested by the teeth 453 of the transfer dogs 436. Each stud 608 will then move free till it encounters the right hand end of the opening 607, and it will continue to move, drawing the slide 602 with it until the spacer 606 has drawn bar 457 away and the left-hand end of the opening 604 has pressed the end 601 of the bar 456 up to the spacer 597 of the side plate 157. The parts are then in the same relative positions but in reverse, as shown in Figs. 36 and 37.

The teeth 453 of the transfer dogs 454 are slightly wider than the spacer 597 of the side plates 156 and 157, and an important advantage results from that fact. To illustrate what is meant, in the particular machine from which the drawings were made, each tooth 453 has a width in inches of .090, whereas each spacer 597 has a width of .070. When, therefore, the parts are set for addition as shown in Figs. 35 and 36, the right-hand edges of the teeth 453 are in alignment with the right-hand edges of the spacers 597, but the left-hand edges of said teeth project .020 beyond the same edges of said spacers; and when the bar 456 is drawn up snug against the spacers 597 in setting for subtraction, all of the transfer teeth are pushed .020 to the right. As hereinbefore mentioned, one of the troubles sometimes encountered in adding machines is due to an overthrowing of the register wheel when it is brought to the "9" position, resulting in a transfer tooth 435 giving a sharp tap against the tooth 453 and knocking the latter free of the comb 454. The device just above described sets the tooth 453 a little nearer the front of the machine in addition, and a little nearer the rear of the machine in subtraction, so as to avoid this danger. Moreover, in total taking, the opposite difficulty occurs in adding machines; that is to say, the type bar is then arrested in printing position by the transfer tooth of the wheel being arrested by the back side of the transfer dog, and any lost motion at that point results in inaccurate adjustment of the type to printing position. The slight movement of the transfer dogs above described tends to cure this trouble also, for, in creating needed lost motion or slack at this point for transferring, the slack on the opposite side of the tooth is taken up, so that in this machine the type bars in total taking are arrested with an excellent degree of accuracy in their appropriate printing positions. It will be recalled that in this machine at the moment of printing the total, the dogs 436 are also set radially inward to a slight extent, as hereinbefore described.

The subtraction key stem 540 (Fig. 38) has a stud 589 standing above an arm 599 fast on the shaft 222, whereby a depression of said key rocks said shaft and locks the numeral keys, and whereby the subtraction key is locked against depression in case a numeral key is held down.

*Algebraic subtraction (credit balance)*

In this machine the addition and subtraction of the fugitive "1", when there is a change of sign of the balance indicated on the register, is accomplished by transfer from the wheel of highest to that of lowest order. The wheel of highest order controls a transfer dog 436, but, instead of one of the regular links 444, its lever 438 has pivoted thereto a specially constructed link 614 (Fig. 26), which at its lower end is guided by an arm like the lever arms 446 but not furnished with an arm 448 controlling a rack. This special link is drawn downward by a special spring 615. Near its upper end it is cross-shaped having two arms 616 and 617 projecting, respectively, forward and back. A bail-shaped piece 618 (Fig. 27) is pivoted at 620 on a post projecting inwardly from the left-hand frame plate 127, and its outer or right hand arm as viewed by the operator is in the nature of a lever of the first order having an ear 621 bent out from its forward arm and an ear 622 from its rear arm. These ears are so disposed that when the register is in its forward or addition position the arm 616 of the link 614 stands above the ear 621 but the arm 617 does not reach to the ear 622 (Fig. 26); but, when the register is in its rear or subtract position, the arm 617 stands over the ear 622. The piece 618 is adapted to rock between two positions. As shown in Fig. 26 the ear 622 is depressed and the ear 621 is elevated, indicating that the register contains a negative balance. If, with the parts standing in this position, a number be added on the register greater than the negative balance already standing there, the highest wheel will be moved by transfer from its 9 to its 0 position, tripping the highest dog 436 and allowing the link 614 to be pulled down by its spring 615, whereupon the arm 616 of said link, acting on the ear 621, will rock the device 618 counterclockwise to the positive position depressing ear 621 and elevating ear 622. If, then, the machine is set for subtraction, bringing the arm 617 over the ear 622, and a number be subtracted greater than the positive balance just produced, this mechanism will be operated as before, but with the opposite result, viz., the device 618 will be swung back to its negative position. After each operation, such as the two just described, the special link 614 and its dog 436 will be restored to normal along with the other transfer mechanisms, but the piece 618 will remain in position until the next change of the sign of the balance. An expansion spring 623 (Fig. 28) connects a stationary stud 624 with a stud 625 in the piece 618, which stud swings from one side of a dead center to the other, so that said spring tends to retain the piece 618 in either of its two positions.

The double rack 113, 114 for the register wheel of lowest order is controlled by a train of transfer devices 436 to 448, exactly the same as the other wheels. Just to the right of this wheel there is journaled on the shaft 340 a device 626 (Fig. 26) having a single transfer tooth in position to engage the tooth 453 of the transfer dog which controls the lowest wheel. This device is operated by a link 627 connecting it with an arm 628 of a bail 630 pivoted on the shaft 527 of the register. The left-hand end of this bail has a rearwardly extending arm 631, which is pivoted to a link 632, which is pivoted to the bail 618 at 629. When the register frame is shifted front and back between its different positions, the link 632 swings idly about its lower pivot; and when the register wheel of highest order passes from 9 to 0 in changing a negative to a positive balance, the device 618 is swung counterclockwise, which, through link 632, swings the bail lever 631, 630, 628, and through link 627, swings the toothed device 626 all in the same direction. The tooth of said device acts on the dog tooth 453 and causes "1" to be transferred to the wheel of lowest order. This whole train of mechanism will remain in this position until a number is subtracted, which changes the balance to negative, at which time the toothed device 626 will be swung in the opposite direction and cause "1" to be subtracted by transfer from the wheel of lowest order.

This algebraic mechanism does not carry "1" to the wheel of lowest order when the capacity of the register is exceeded in either direction. If, for example, the register indicates a negative balance, the pivoted device 618 will stand in the position shown in Fig. 26 in which the ear 622 is depressed. In a subtracting operation the link 614 will stand in its rear position with its arm 617 over the already depressed ear 622. If now a number be subtracted, giving a total which exceeds the capacity of the register, the highest wheel will trip its transfer dog and the link 614 will move downward, but, as the ear 622 is already down, this motion will be without effect. A similar thing would occur on a positive over-running of the register. Such a positive over-running of the register would cause the highest wheel to register "1" instead of its usual 0, and the mechanism would not shift to a negative balance, until this 1 had first been subtracted out, which, as there are more register wheels in the machine than there are columns of key-set stops 105, can occur only by transfer. The over-running must therefore be corrected before the machine can shift to a negative balance.

*Printing a negative (credit) balance*

As will be understood, the transfer mechanism of this machine is of such a type as to require to be reset by a "blank stroke" of the machine before printing a total, that is to say, a cycle of operation of the main shaft 115 without effecting any computation.

Means are provided whereby, during any blank stroke of the machine when the register indicates a negative balance, the machine will be automatically brought to or retained in subtraction condition, so that, if that stroke is followed by a total-taking stroke, the total will be taken from the subtraction racks 114 and the true negative balance will be printed instead of its complement. This mechanism is controlled in part by the bail 618 whose position always indicates the sign of the balance in the register. As best shown in Figs. 27 and 28, the left-hand arm of this bail is in the form of a gear sector 633, which meshes with a sector 634 formed on the left-hand arm of a long bail 635, which is pivoted on the transverse shaft 308 hereinbefore referred to. The right-hand arm of bail 635 carries a stud 636 (Figs. 27 and 29) to which is pivoted a link 637, which at its lower end is pivoted to the inner arm of a bail 638, which is pivoted on a post 640 projecting rightward from the frame plate 128. Another bail 641, to be presently described, is pivoted on the same post, the bail 638 being nested into the bail 641. The outer arms of both bails extend toward the front of the machine and are shaped as stop arms 639 and 649 respectively (Figs. 29 and 38). It will be recalled that the rock arm 551 (Fig. 38) has pivoted to the stud 550 thereon a hook 548, which sets the machine for subtraction when the subtraction key is depressed. The pivot end of this hook is bail-shaped so as to provide a pivot at two points. Nested within this bail is the bail-shaped pivoted end of a second hook 642 which normally lies as shown in Fig. 38 in engagement with the same ear 564 on lever 563 as is adapted to be operated by the hook 548. This hook 642 has an arm 643 from which a stud 644 extends adjacent to and forward of the two stop arms 639 and 649. The construction is such that if both of these arms are in their upper positions shown in Figs. 29 and 38, when, in the first part of the forward stroke of the main shaft the arm 551 is swung rearward, the stud 644 will swing back under said arms and the hook 642 acting on lever 563 will cause the machine to be set for subtraction as hereinbefore described. If, however, either of the arms 639 or 649 is dropped down behind the stud 644, then on the rearward motion of arm 551 this stud will be arrested and the hook 642 swung upward out of engagement with the ear 564 and the machine will retain its addition setting. Tracing back the connections which control the stop arm 639, it will be seen that this arm always stands in its upper position when the register indicates a negative balance, and in its lower or blocking position when it indicates a positive balance. It is therefore impossible for the hook 642 to set the machine for subtraction when the register shows a positive balance, but, when the register is in a negative condition this hook may create a subtraction setting and will do so provided the stop arm 649 is also in its upper position. The machine can, of course, be set for subtraction at any time by the hook 548 under control of the subtraction key.

If the hook 642 were controlled solely by the register acting through the stop arm 639, it would set the machine for subtraction at every operation when the register stood negative. What is required for correct operation is that this be done and done only on blank strokes and total-taking strokes. On such strokes the stop carriage 106 is in its right-hand or retracted position and whenever one or more numeral keys have been operated to effect a computation, this carriage is one or more steps to the left of that position. The stop arm 649 for the hook 642 is, therefore, controlled by said carriage in such wise that it stands in its upper position when the carriage is in retracted position, but will drop down to its blocking position on the first step of the carriage leftward.

The means for controlling the blocking arm 649 are best shown in Figs. 39 and 41. A long link 645 is pivoted to the bail 641 and, at its forward end, to an arm 646 bail-pivoted on a stud 647 projecting from the righ-hand frame plate 142 of the keyboard section, said link drawn front-ward by a spring 648 tending to depress the arm 649 to blocking position. An arm 650 projects into a notch in the link 645, this being an extension of the lower arm of a bail 651 pivoted on a vertical rod 652 mounted in ears 653 projecting rightward from the frame plate 128. In the present instance these ears are conveniently bent off from the same piece of sheet metal which forms the wiper plate 281. An arm 654 projects from the bail 651 into the path of a roller 655, mounted on the right-hand end of the carriage 106, said arm so shaped that, when the carriage in its retracting movement, comes to its rest position shown in Fig. 41, it swings the bail counterclockwise to the position shown in Figs. 39 and 41, and the arm 650 forces the link 645 rearward and raises the arm 649. The arm 654 is prolonged rightward into a dwell as shown in Fig. 41, because, when the carriage is first restored, it is moved beyond its rest position, back to which it finally drops. At the first step of the carriage 106 to the left, the roller 655 permits the bail 654 to be rocked by the spring 648 and the stop arm 649 to drop down to blocking position. The construction is such that the hook 642 cannot set the machine for subtraction during a computing operation, that is to say, when the carriage 106 is out of its retracted position. The whole construction is such that, if a cycle of the shaft 115 be effected at any time when the carriage 106 is in retracted position, that is to say on a blank stroke or a total-taking stroke, and the register shows a negative balance, the machine will be automatically set for subtraction and will retain that setting during the total or sub-total cycle.

*Carriage return and multiplying (repeat) mechanism*

In order to return the stop carriage 106 to its right-hand position the latter (Figs. 7 and 9) has pivoted thereto and projecting leftward therefrom a push link 660, which, at its free end, is pivoted to a restoring lever 661 whose connections are best shown in Fig. 3. Secured to the outer face of the left-hand frame plate 127 is a sheet metal bracket comprising a branch 662 secured to the frame plate by screws, a horizontal part 663 bent off therefrom and an upstanding arm 664. Secured to the horizontal section 663 of this bracket is a bearing piece 665 in which is journaled a short shaft 666 to a hub on the upper end of which the arm 661 is fastened. This arm or lever comprises several teeth 667 in the nature of beveled gear teeth, and these mesh with similar teeth on a bail-shaped member 668 pivoted on a screw 670 passing through the two upright parts 662 and 664 of the bracket. A screw pin 671 passing through the two branches of the device 668 furnishes a bearing for an anti-friction roller 669. The gear teeth of the device 668 are on the right-hand branch of said device. The construction is such that, when the device 668 is rocked clockwise in Fig. 3, the lever 661 will be swung away from the observer, that is to say, toward the right-hand side of the machine, and will push carriage 106 to its right-hand position.

The device 668 is operated by a hook 672 which, as best shown in Fig. 13, is pivoted on a stud 673 on the lower arm of a plate or lever 674, which is loosely pivoted on the main operating shaft 115 just to the left of the gear sector 310, which, as hereinbefore described, is fast on said shaft. The hook 672 is pivoted on the stud 673 at the left side of the plate 674, but said stud (Fig. 12) extends through said plate into the path of a shoulder 675 on a device 676 (Fig. 14), which device is secured by two rivets to an arm of the gear sector 310. A spring 677 tends to rock the plate 674 clockwise in Fig. 13 and thus press the stud 673 against the shoulder 675. The construction is such that on the forward stroke of the shaft 115 the device 676 will swing toward the back of the machine followed under the force of the spring 677 by the stud 673 and link 672, which link will thus be moved rearward until a horizontal guide portion 678 thereof drops off the rollers 669, thus bringing the hook into engagement with said roller. Said roller meanwhile will have been fed toward the rear of the machine by the stepping of the carriage 106 leftward.

The multiplying key 123 has its stem 680 (Fig. 13) guided in the upper and lower frame plates 143 and 144, and it has the irregular shape shown in Figs. 3 and 13. The key is drawn upward to its normal position by a spring 681 until arrested by any suitable means, such as that shown at 682. The key stem 680 has an arm 683 projecting rearwardly therefrom in the plane of the pivoted device 674, which device has a finger 684 projecting therefrom in such a position that, after said device 674 has swung a sufficient distance clockwise, its motion would be arrested by this finger striking the arm 683. The hook 672 will then move no further rearward, but it will be drawn toward the front of the machine to restore the carriage in the latter part of the return stroke of the shaft 115; that is to say, after the lost motion has been taken up between the shoulder 675 and stud 673.

As has been pointed out hereinbefore, the carriage is first moved a certain distance beyond its rest position and then allowed to drop back to its rest position, shown in Fig. 7, where it is arrested by the first rack tooth 267 engaging the escapement dog 268. In order to bring about this mode of operation the device 668 has a rearwardly projecting arm 685 on a stud from which is mounted an anti-friction roller 686 in such a position that in the last part of the operating stroke of the link 672 when it is drawing the device 668 clockwise in Fig. 3, this roller, striking the under edge 678 of the pawl 672, lifts said pawl out of engagement with the roller 669. At the moment when this occurs the carriage has been moved to its extreme position and, as soon as the mechanism is free of the roller 672, the parts drop back to the rest position, shown in Fig. 3, where the roller 669 is underneath the surface 678 of the hook, and where the carriage is in its rest position.

The condition of a repeat operation is that the carriage 106 be not drawn back after a computation, but remain for a second operation with the stops set as before. To this end the device 674 is formed with an abrupt edge 687, Fig. 13, which, when the key 123 is depressed, stands immediately behind the arm 683 so that on an operation of the main shaft the device 674 does not rock but it and the carriage remain stationary. The number set up on the carriage may be repeated as many times as desired by holding this key down, releasing it, however, for the last operation, so that following such operation the carriage may be returned.

A latch 690 is provided to hold the multiplying key down when it is first depressed, said latch engaging a lug or ear 691 bent off from an arm of the key stem. This latch is pivoted at 692 on a stud projecting from the frame plate 142. It is made in the form of a bell crank having an arm which projects forward in front of said frame plate, and is secured to a long cross bar 693 which (Fig. 6) extends across in front of the keyboard section. It will be recalled that the total key 124 is provided with a latch 385 controlled by a spring 390 (Fig. 19). As shown in Fig. 6 this latch is part of a bail-shaped piece pivoted on the stud 383, the other branch of the bail being formed into a latch 694 (Figs. 6 and 38); and the bar 693 is secured to said bail by a screw 689, thus connecting the three latches 690, 385 and 694 into a rigid structure controlled by the spring 390. As shown in Fig. 38 the latch 694 is adapted to engage an ear 695 of the subtraction key stem 540. It will be perceived that, if anyone of the three keys mentioned, namely, the subtraction key 121, the multiplying key 123, or the total key 124, be in set position, it will be released by a clockwise rocking of this structure or frame. Such motion is imparted to the frame as follows (Figs. 39 and 40):

The cam 305 on the main shaft 115 has a concentric part a, a rise b, and a high concentric part c. A follower roller 696 is mounted on a lever 697 pivoted on the same post 380 as the total key 124 and influenced by a spring 699, and said roller is in position to be moved toward the front of the machine by the rise b of the cam in the last part of the forward stroke of the shaft. This lever, near its forward end, carries a pin 698, which overlies an arm 700 projecting rearward from the latch lever 694. The construction is such that this whole triple latch frame is tripped in the latter part of the forward stroke of the handle.

However the multiplying key should not be released until near the end of the return stroke of the shaft. It is retained in position until that time by the now to be described means.

An interlock is provided which prevents rotation of the shaft 115, while the key is partially depressed, but not when fully depressed, and which, during the operation of said shaft, locks the key in normal position or, if depressed, in depressed position until the shaft returns to normal. A substantially similar interlock is used in connection with other keys. As best shown in Fig. 13, the stem 680 of the multiplying key has an arm 701 projecting forward therefrom and offset toward the operator's left. The forward end of this arm is in the nature of a V-shaped nose or hump, which normally lies just above a lug, stud or roller 702 which (Figs. 3, 24 and 25) projects from the depending arm of an interlocking member or lever 703, which is loosely pivoted on the shaft 222 hereinbefore referred to, and is influenced clockwise in Fig. 3 by a spring 704. This device has a rearwardly projecting arm which, near its rear end, has an edge 705 concentric with the main shaft 115, said edge followed by an upwardly extending abrupt edge 706. Rigidly mounted on said shaft (see also Fig. 12) is a disc 707 having an abrupt edge 708 followed by a concentric or dwell portion. The construction is such that, when the multiplying key is in the act of being pushed down, the stud or roller 702 is pushed first toward the front of the machine, and then, under the impulse of the spring 704, moves in above the nose 701 of the key stem. When the device is thus rocked, first counterclockwise and then clockwise, in Fig. 3, its edge 706 moves down in front of the edge 708 of the disc 707 and prevents rotation of the main shaft while the key is in a partially depressed position, but, when the key is fully depressed, the device 703 returns to its normal position, shown in Fig. 3.

As soon as the main shaft begins to turn, the concentric portion of the disc 707 moves under the concentric edge 705 and prevents any rocking of the device or lever 703 until the shaft returns substantially to normal position. Since this device cannot rock, the stud 702, acting on the nose 701, prevents the return of the multiplying key to normal position. In case the multiplying key is up when the shaft 115 turns, this device locks it against depression until the shaft returns to normal position. The latch 690 is provided because this last described locking device does not begin to act until the main shaft turns.

It will be perceived that the device thus described has two functions, namely, it prevents rotation of the main shaft, while the multiplying key is in a partially depressed position, and it locks said key up or down as the case may be during practically the entire cycle of the main shaft. It should be remarked that the multiplying key may be held down by the operator's finger as long as desired, so as to repeat the addition of a number as often as desired.

In order to lock the keyboard when the multiplying key is depressed the stem 680 of said key is provided with a stud 710 (Fig. 13) which, when the key is depressed, rocks an arm 711 which is fast on the shaft 222, which, as has been explained in the description of the keyboard section, locks the numeral keys against operation.

*The locking devices for the subtraction key*

The subtract key 121 when it is first depressed is locked down by the latch 694, and this latch is released in the latter part of the forward stroke of the main shaft, as explained in connection with the multiplying key. In order to hold said key down during the remainder of the cycle, a device is employed somewhat similar to that moved by the multiplying key. As shown in Figs. 2 and 19, the subtract key stem 540 has a stud 711, which is adapted to rock an interlocking member 712 momentarily during the depression of the key. The device 712 is pivoted on the shaft 222 and is urged counterclockwise by a spring 713. Its depending arm has a nose 714, and the stud 711 on the subtraction key normally stands in engagement with the upper slope of this nose, and, when in its depressed position, it is underneath the lower slope thereof, the depression of the key causing a momentary vibration of the device 712 first clockwise and then counterclockwise. Said device has a rearwardly extending arm, which has a concentric edge 715 followed by an abrupt edge 716. This device is in the plane of the cam plate 306, which has an abrupt edge 717 followed by a concentric edge 718. When the device 712 is rocked downward during the depression of the subtract key, the edge 716 moves in front of the edge 717 and prevents operation of the main shaft, but, on completion of the down stroke of the key, this device immediately rocks back to its normal position. As soon as the shaft begins to turn, the concentric edge 718 moves under the concentric edge 715 and prevents further rocking of the lever until practically the end of the cycle. During this time this stud 711 of the subtract key is, therefore, held down by the nose 714. As soon as the main shaft returns to its normal position the subtract key will return to its normal position, momentarily rocking the device 712. This same device prevents depression of the subtract key whenever the main shaft is out of normal position.

The device 712 also serves to control the total key 124 in much the same way as it controls the subtraction key. As best shown in Fig. 19 said key 124 has a roller 720, which engages the upper edge of the device 712. Said edge has three notches, namely, a middle one 721, in which the roller 720 normally rests, a forward notch 722, in which the roller engages when in its forward position, and a rear notch 723, in which the roller engages when in its rear position. These notches are separated by V-shaped noses so that, when the key 124 is moved from its normal position to either of its said positions, it momentarily depresses the device 712 into position to lock the main shaft, the device returning to its normal position when the key is fully set. As soon as said shaft begins to turn the device 712 is locked against rocking motion, and it, therefore, prevents the return of the total key to normal position until the end of the return stroke of the main shaft. This same device will, of course, also prevent the total key from being moved away from its normal position at any time when the main shaft is out of its normal position.

An interlock is provided between the numeral keys and the total key 124. This comprises a two armed lever 724 (Fig. 2) fixed on the rock shaft 222 of the key-locking mechanism. The rearward arm of this lever has an inclined end normally standing in front of he roller 720, so that, if the key 124 is drawn forward to its subtotal position, it will rock the shaft 222 clockwise and thus lock the keyboard as hereinbefore explained. The downwardly directed arm of the lever 724 stands just above another roller 725 on the total key in such position and so shaped that, if the total key be pushed to its rear or total taking position, this roller will rock the shaft 222 clockwise and lock the keyboard. Also, of course, this device prevents any movement of the total key from normal position when any numeral key is in depressed position, as the latter condition locks the shaft 222 as hereinbefore explained.

The non-add key 122 is controlled in part by the same device 703 which is one of the controls of the multiplying key and in much the same way. As shown in Fig. 25 the shaft 427, which is rocked by a depression of a non-add key 122, has near its right hand end a forwardly extending arm 726, to which is pivoted a sliding link 727 having its upper end forked and guided by the rock shaft 222. This link 727 has a nose 728 normally lying just under the same stud or roller 702 as that associated with the multiplying key. The construction is such, that when the non-add key is being depressed the nose 729 momentarily rocks the lever 703 clockwise which, however, moves back to normal position when the key is fully depressed, and the nose 729 is above the stud 702. This prevents any rotation of the shaft 115 while the non-add key is partially depressed, and once the shaft begins to turn the cam or arc 707 prevents any rocking of the lever 703 and, therefore, causes the stud 702 to hold the link 727 in its lower or its upper position and the key 122 in its normal or depressed position as the case may be until the shaft 115 returns to initial position.

When taking totals, it is desirable that the machine be set automatically for addition or for subtraction depending on the state of the totalizer at the time. It is, therefore, desirable that an interlock be provided between the subtraction key and the total key. As best shown in Figs. 38 and 39 the subtract key has a stud or roller 730, which is in position to engage just above a shoulder 731 in the rear edge of a locking member 732, which is pivoted on the shaft 222, and is urged counterclockwise by a spring 733. The construction is such that, when the subtract key is depressed, the member 732 is swung toward the front of the machine. The edge of said member below the shoulder 731 is shaped to constitute a long dwell for the roller 730 so that the member 732 occupies its forward position at all times, except when the subtract key is fully elevated. As shown, for example, in Fig. 23 the total key 124 has a forwardly extending arm 734 bent leftward out of the general plane of said key and having at its forward end an ear 735 lying just in front of the member 732, as shown in section in Fig. 39. When the total key is in its normal position, this ear 735 stands in front of a notch or cut-out 736 in the front edge of the member 732, and, when it is swung to its forward or its rear position, the ear 735 moves in front of portions of the member 732 that are concentric to the pivot 380. The construction is such that, when the member 732 stands in its rear position, shown in Fig. 39, the total key may be moved to either of its said positions, but, if the member 732 be swung forward, the notch 736 will embrace the ear 735 and prevent movement of the total key. Also, if the total key is in one of its set positions, the member 732 will be locked against forward motion and the subtraction key locked against depression. The construction is such that neither the subtract key nor the total key can be moved from normal position when the other is out of normal position.

The blank stroke lock

In this machine it is necessary that a blank stroke be taken before taking a total, and means are, therefore, provided to lock the total key unless the last preceding cycle of the machine was a blank stroke. To this end the lever arm 646, Figs. 39, 40 and 41, to which the long link 645 is pivoted, has at its upper end a stud 740 lying just in back of the lower end of the device 732. In Figs. 39 and 41 this link is held in its rear position by the roller 655 on the stop carriage 106, which stop carriage is standing in its initial position. When a number is set up on the keyboard, this carriage steps to the left and the spring 648 draws the link 645 forward, which, through stud 740, swings the device 732 to its forward position locking the total key against operation. The locking lever 732, hereinbefore described, has an ear 741 bent off therefrom, and in Fig. 39 the upper edge of the lever 697 is pressed against this lug or ear by the spring 699. The upper edge of the lever is formed with a notch so situated that, when the device 732 is swung to its locking position, the lever 697 snaps up behind the ear 741 and locks the lever 732 in its locking position. It will be noted that this action occurs during a stroke when the subtract key was in its depressed position. It will be recalled that the lever 697 is rocked counterclockwise by the cam 305 in the latter part of the forward stroke of the main shaft, but this cam moves off of the roller 699 early in the return stroke of the main shaft. The subtract key does not return to normal position until the end of the return stroke so that at the end of the cycle the device 732 would remain locked in locking position. The same thing occurs during a computing cycle, that is to say, a cycle in which a number is added or subtracted during the operation of the keys. Before the shaft 115 begins to turn, the carriage 106 takes a step to the leftward and the spring 648 moves the device 732 to locking position where it is latched. In the last part of the forward stroke and the early part of the return stroke of the shaft 115 and cam 305 the latch lever 697 is temporarily released, but the device 732 is still held in locking position by the spring 648 and lever 646, which latter do not return to their rear positions until the carriage 106 is restored in the latter part of the return stroke of the main shaft. As soon as a numeral key is struck, therefore, the total key is locked against operation and it remains locked throughout and after the end of the computing cycle. It is, therefore, impossible to set the total key following a computing cycle. When, however, a blank stroke is taken, during which the subtract key is in its normal position, the latch lever 697 is tripped in the middle of the blank cycle and the device 732 immediately moves to its unlocking position shown in Fig. 39. It will be noted that this device does not prevent one total-taking operation from following immediately after another.

Correction key

The purpose of this key is to erase the set up on the stop carriage 106 in case of erroneous operation of a numeral key. As shown in Fig. 3 the correction key 125 consists of a lever at the left-hand side of the keyboard, pivoted on a stud or post 742 projecting leftward from the lefthand frame plate 142 of the keyboard section. This lever is in the nature of a bail whose outer arm is prolonged upward to constitute the key, and which is urged counter-clockwise in Fig. 3 by the spring 743. The inner arm 744 of this lever has pivoted thereto a long link 745 which, near its rear end, rests on the roller 669 of the carriage returning mechanism, and at its extreme rear end is formed into a hook for operating said roller. The construction is such that when the key 125 is drawn toward the front of the machine the link or hook 745, acting on the roller 669, operates the carriage returning mechanism, forcing the carriage back to its extreme right-hand position and restoring all the set stops to normal position in the manner that has been described. It will be recalled that when the carriage is returned automatically by the link 672, the roller 686 in the last part of the operation lifts the hook 672 out of engagement with the roller 669 and allows the pivoted device 668 to drop back under said hook. This roller 686 is not long enough to reach to the hooked end of the link 745 so that it does not act on said hook. When the operator pulls the correction key, he rocks the device 668 to its extreme position and it returns to its proper normal position when he lets go of the key. In this operation the roller 686 prevents the hook 672 from dropping back into engagement.

The correction key 125 is arranged to cooperate with the locking lever 703 for the same purpose as other devices. To this end the upper edge of said device 703 is formed with a depression 746 and a stud 747 on the key 125 normally rests in said depression so that, when the key is drawn forward, the lever 703 is depressed and its edge 706 moves in front of the edge 708 of the disk 707 and prevents rotation of the main shaft while the correction key is out of normal position. The edge of said lever 703, forward of the depression 706, is made concentric with the pivot 742. Once the shaft 115 has begun to turn the disk 707 locks the lever 703 against depression, and, therefore, locks the correction key against operation.

Operating mechanism locks keyboard

In order to lock the numeral keyboard during the entire cycle of operation of the main shaft 115 a lever 750 is provided (Figs. 13 and 14) and pivoted at 751 to the inside of the lefthand frame 142 and bearing a stud or roller 752 adapted to be struck by the forward end of the piece 676 which, as above described, is fast on the sector piece 310, which, in turn, is fast on the main shaft 115. The forward arm of the lever 750 is drawn downward by a spring 753 against a stud 754 projecting from the lefthand arm of the bail 221, which arm, as above described, has a finger projecting into one of the slots 218 of the bar 152, and which co-operates with the locking pendants 220. This bail 221 is in effect fast on the shaft 222. The construction is such that, when the shaft 115 is in normal position, the piece 676 holds the lever 750 in its inactive position, shown in Fig. 14, but, as soon as the said shaft starts to rotate on its forward stroke, the spring 753 rocks the lever 750 clockwise and the bail 221 and shaft 222 counter-clockwise in Fig. 14, locking the keyboard and performing all other functions that are performed by rocking of the shaft 222. This lock is released by the piece 676 at the end of the return stroke of the shaft 115.

The hammer mechanism

This is best shown in Figs. 1, 4, 5, 12, 42 and 43. The hammers 755 are pivoted on the cross rod 180 of the hammer section and are operated by springs 756. Each of the hammers, as shown in Fig. 42, has an arc-shaped lower portion guided in a suitable perforation in the plate 184, and the upper parts of the hammers are guided by the comb plate 183 to which the springs 756 are also anchored. The hammers are restored to and held in normal position by a bail structure comprising a cross bar or rod 757 and two side arms 758 pivoted on the rod 180, and each having a forwardly extending arm, which is connected by a link 760 with a frame pivoted on the shaft 328 and consisting essentially of two side arms 761 connected by a cross bar or bail 762, the two arms 761 lying, respectively, just inside the frame plates 175 and 176 of the hammer section. One or both of the arms 761 is drawn upward by a spring 763. Each of the arms 761 is prolonged forward of the shaft 328, where they support a cross rod 764 on which is journaled a follower roller 765, which is pressed by the spring 763 against a cam 766 fast on the shaft 115. This cam has the outline best shown in Fig. 43, which shows the parts in normal position with a roller 765 resting on the high part of the cam. The cam gradually drops away toward the rear of the machine so as, in the first part of the forward stroke of the main shaft, to let the restoring bar 752 move gently toward the rear of the machine, but in the latter part of the forward stroke of the shaft and cam the roller 765 is entirely free of the cam and the bar 752 occupies its extreme rear position entirely out of the way of the hammers. The bail bar 757 is swung forward to return the hammers in the latter part of the return stroke of the shaft.

As shown in Fig. 12, the follower roller 765 is made in three sections, defined by guide flanges 759, the three sections of slightly different diameters; and a guide tongue 769 projects from the bail bar 762 in the plane of the cam 766, said tongue lying between two of said flanges and preventing endwise motion of the roller. By placing one or another of the three sections of the roller in engagement with the cam, an adjustment of the restoring bar 757 is conveniently afforded. Each of the hammers 755 has a forwardly directed arm adapted to be controlled by a latch 767, these latches being pivoted on a cross rod 768 supported by the side plates of the hammer section. The latches are guided near their pivots by the comb plates 185 and near their upper ends by the comb plate 184.

Each of the latches has pivoted thereto a tripping dog 770 extending toward the rear of the machine, and having a spring 771 acting thereon in such a way as to tend to swing the dog 770 upward about its pivot and also to draw said dog and the latch 767 toward the rear of the machine, the latter into position to latch the associated hammer. Each of the dogs 770 is normally held in its depressed position shown by a stud 772 projecting from the associate type bar 107. As soon, however, as this type bar rises two spaces above its normal position, it allows the spring 771 to swing the dog 770 up far enough to permit a shoulder 773 on the dog to engage a lip or flange 774 bent down from the rear edge of a tripping plate 775. This tripping plate extends transversely across the hammer section, passing through slots 776, Fig. 4, in the side plates. At each end the bar or plate 775 has a releasable interlocking connection with a link member 777 lying outside of the frame plate and drawn toward the front of the machine by a spring 778. Each link 777 is pivoted on a stud 780 projecting from an arm 781 fast to and depending from a rock shaft 782, which rock shaft is pivoted at its ends in the side plates 175 and 176 of the hammer section frame work. The two arms 781 lie, respectively, just inside said frame plates, and the studs 780 projecting outward through suitable openings 783, Fig. 4, in said plates. Fast on the shaft 782 is a gear-toothed sector 784, whose teeth mesh with another segmental gear 785 loose on the shaft 328 (Figs. 42 and 12). This piece 785 has a finger 786 depending therefrom in position to be struck and rocked clockwise by a stud 787 projecting from an arm 788 fast on the main shaft 115. When the device 785, 786 is rocked clockwise by the stud 787, the springs 778 tend to restore it and the connected parts to normal position in the first part of the return stroke of the operating shaft. This is, however, also done positively by the stud 787 engaging behind a second finger 790 of the piece 785.

This mechanism operates as follows: The type bars 107 normally occupy a position below any printing position. If a type bar is raised only high enough to bring the zero type to printing position, the dog 770 will not engage the tripping plate 775, but it will engage said plate if the type bar is raised high enough to print 1 or any larger number. Said tripping plate normally occupies its forward position, shown in Fig. 43, so that, when the dogs 772 first move upward, they are arrested by the lower edge of the flange 774. At the extreme end of the forward stroke of the main shaft the stud 787 rocks the piece 785 clockwise and the piece 784 and shaft 782 counterclockwise, thus sliding the plate 775 a short distance toward the rear so that any raised dogs 770 will have their shoulders 773 snap in front of the flange 774. In the first part of the return stroke of the shaft the parts will move in the opposite direction, the plate 774 being drawn toward the front of the machine, causing the dogs 770 to trip the latches 767. When the type bars 107 are restored to their normal depressed positions, the studs 772 release the dogs 770 from the flange 774. Each of the latches 767 has, at its upper end, the usual ear 791 bent off leftward so as to stand behind the next latch to the left so that, if any one of said latches is tripped, it will carry with it all those to the right of it in order to print the significant zeroes.

The hammers have only a short stroke as will be apparent from the drawings. In order to give their blow the necessary force each hammer at its upper end is thickened as indicated at 792. In other words, these hammers are weighted. This arrangement contributes to the speed of the machine in that the hammers have not a long path of travel.

In order to eliminate printing when desired, a non-print key 793 is provided projecting through the casing above the left-hand side of the hammer section. This consists of a sliding bar of sheet metal forked at its lower end, as shown in Fig. 43, said fork embracing, and guided by, the shaft 782. This key is drawn upward by a spring 794, but it can be pressed down and a shoulder 795 thereon may be caught under the shelf of the comb plate 183 so as to lock the key in its depressed position. One of the branches 796 of this key has its lower end so located that, when the key is depressed, said lower end will stand over a stud 797 projecting inward from the lefthand arm 761 of the bail 761, 762. When this key is in depressed position and the main shaft is rocked forward this bail cannot swing clockwise and the restoring bar 752 for the hammers cannot move rearward. In other words this key locks the hammers against operation.

*Designation printing*

Just to the right of the type bar 107 of lowest order there is arranged a special type bar 800 (Fig. 44) containing special types for printing various designations. In the present instance six such types are shown, all normally below the printing point. The type bar 800 is guided in the same way as the numeral type bars, and is pulled upward by a spring 294, and pressed to its lower or normal position by the bar 336 in the same manner. This type bar, however, does not have any finger 285 (Fig. 23) for cooperation with the stops 105 in the carriage 106, but is, on the contrary, controlled by special devices now to be described, said devices co-operating with a special ear 799 bent off from a rearward projection of the type bar in position to be arrested by certain special stop devices. A long sliding bar 801 is guided in the comb plates 432 and 433 (Figs. 33 and 44) and it has a longitudinal slot 802 which is guided on the rod or shaft 447 and near its front end another slot 803 by which it is guided on the post 393 which projects a short distance inside of the frame plate 128 for the purpose. The bar 801 has a stud 804 projecting inward therefrom into a vertical slot in a lever 805, pivoted at 806 on a stud secured to the frame plate 128. The lever 805 has an upwardly projecting arm, which is normally pressed toward the front of the machine by a depending finger of the plate or lever 463, which, as hereinbefore described, is fast on the main shaft 115. The construction is such that this and the lever connection just described normally holds the bar 801 in its rear position but in the first part of the forward stroke of the main shaft it is allowed to slide forward, drawn by a spring 807, until it is arrested by a shoulder 808 thereon striking the forward comb plate 433. Said bar 801 has a branch or arm 810 projecting upward therefrom and having three over-hanging steps 811, 812, and 813, of progressively greater heights, one or another of these steps in certain operations serving to arrest the stop ear or lug 799 on the type bar 800, depending on how far forward the bar 801 is drawn. In an adding operation it moves to its extreme forward position just above described, which brings the lowest one 811 of the three steps over the lug 799 and prevents the bar 800 from rising to any printing position.

At its extreme forward end the bar 801 has an ear or arm 814 bent horizontally leftward therefrom in such position that, when said bar moves forward said ear moves underneath the lever arm 543, which carries the stud 545, which is depressed when the subtract key is operated. When said subtract key is depressed the abrupt end of this arm 543 moves in front of the ear 814 and arrests the bar 801 after a single unit of forward movement of the latter, bringing the uppermost one 813 of the three steps of the arm 810 into position to arrest the lug 799. This brings to printing position the minus type which is the second type from the top in the bar 800.

The lever arm 428 (Fig. 44), which, it will be recalled, is swung downward when the non-add key is depressed, has an ear bent off therefrom in such position as, when the non-add key is depressed, to move in front of an ear 816 (best shown in Fig. 33) bent off from the bar 801. This brings the second step 812 into the path of the lug 799 and causes to be printed a "V" or any other suitable character to indicate "non-add."

Four designations are printed for totals, namely, a star for a positive total, a star followed by a minus sign for a negative total, "S" for a positive sub-total, and "S" followed by a minus sign for a negative sub-total. It will be recalled that, when the total key is set to take either a total or a sub-total, the bar or slide 404 is pulled downward rocking the lever 498 to the position shown in Fig. 19, which, in turn, rocks the cam 501, which, in turn, rocks the lever 503 counter-clockwise to the position shown in Fig. 19. The extreme lower end of this lever (Fig. 44) carries a stud 817 which, when the lever is swung counter-clockwise by a setting of the total key, stands just in front of a hook or abutment 818 on the rear end of the slide 801 with the result that, when the shaft 115 is rocked, this slide is prevented from moving forward at all. In the case of a positive sub-total, the type bar 800 and its stop lug 799 move upward to the extreme limit of their movement where said lug is arrested by a stop edge 820 made for the purpose on the right-hand side plate 157 of the register frame. In the act of taking a positive total or sub-total this register frame stands in its forward position (shown in Fig. 44) at which time the edge 820 is in position to arrest the lug 799. When, however, a negative total or sub-total is being taken, the register frame occupies its rear position, which brings into the path of the lug 799 the lower edge of a finger 821 made for the purpose on the frame plate 157 and occupying a position two type spaces below the edge 820. This will bring to printing position the third type from the bottom of the set printing "S—" to indicate a negative sub-total.

The means for bringing the two star types to printing position on the taking of positive and negative totals includes a settable stop device 822 pivoted ball-fashion on the shaft 447. This device consists of two arms connected by a bail bar 823. The outer one 824 of these arms is influenced by a spring 825 urging the device to swing clockwise in Fig. 42. The inner arm of this device has two stop edges, namely, an upper one 826 of a height midway between the two sub-total stop surfaces 820 and 821 and a lower stop surface 827 of an effective height between that of the negative sub-total stop and the minus stop. If the arm 822 be swung a suitable distance toward the rear so as to bring the surface 826 into the path of the lug 799, it will arrest the type bar in position to print a star from the second type from the bottom of the set, whereas, if it be moved toward the rear a greater distance, the lower stop 827 will stand in the path of the lug 799 and cause printing from the fourth type from the bottom of the set. It will be recalled that in total taking the bar 801 does not slide forward.

The device 822, 824 is held in its normal inoperative position shown in Fig. 44, by means of a long lever 828 whose lower end normally presses forward on a stud 830 projecting from the arm 822 and thus restrains the device against the action of its spring 825. The lever 828 is pivoted to the frame plate 128 at 831 and its upper arm extends upward and forward therefrom, its extreme upper end 832 being in the nature of a forward projection, which rests on a stud 833 projecting from a lever arm 834, which is pivoted on the same post 402, which guides the bar 401 of the total taking mechanism. It will be recalled that this bar normally occupies its upper position and that it is pulled downward to its lower position when taking a total, but not when taking a sub-total. The lever 828 is just inside the main frame plate 128 and the bar 401 stands at some distance to the right of said plate. The arm 834 is one arm of a bail which comprises a bail bar 835 and a right-hand arm 836, the arm 834 lying just outside the frame plate 128 and the arm 836 lying just inside the bar 401, which latter has a stud 837 projecting into an open ended slot in the arm 836. The whole construction is such that, when the bar 401 is in its upward position, as it always is except in a total taking operation, the stud 837, acting through the bail lever including the arm 834 and 833, holds the lever 828 in the position shown in Fig. 44, and the latter prevents the stop device 822 from being swung clockwise by its spring 825. When, however, the total key is set for taking a total, the bar 401 moves downward and the train of mechanism, just described, is also freed to the action of the spring 825, which swings the stop arm 822 clockwise until its upper end is arrested by a stud 838 on the side plate 157 of the register frame. When said frame is in its addition position, shown in Fig. 44, as it is when taking a positive total, this brings the upper stop portion 826 of the member 822 into the path of the lug 799 and causes the machine to print a star. When taking a negative total, however, the register frame occupies its rear position, the stud 838, of course, moving rearward with it and permitting the arm 822 to be drawn far enough to the rear to bring the stop portion 827 thereof in to the path of the lug 799 and causing the machine to print a star followed by a minus sign.

It may be remarked that, as viewed from above, the bar 801 is not straight but contains certain offset bends to bring the different sections thereof into the proper planes for cooperation with the several devices described.

The motor drive

This may be of any suitable character that affords a single rotation to the drive wheel or spider 326. The drive shown diagrammatically in Fig. 3 gives advantageous results. The armature shaft of the motor 118 (Fig. 1) is coupled to a shaft 840 (Fig. 3) carrying a pinion 841 meshing with planetary gears 842 journaled on the spider 326. The gears 842 mesh with an internal gear 843 which is rotatable but is normally held stationary by a friction brake comprising a brake shoe 844 mounted on a lever 845 and pressed by a strong spring 846 against a drum rigid with the gear 843. The gear 843 and its drum are suitably mounted on the stationary framework for rotation; the spider 326 has a hub 847 inside the hub of said gear 843 and drum; and the shaft 840 is rotatable inside the hub 847. The whole construction is such that when the shaft 840 turns counter-clockwise in Fig. 3, the gear 843 will ordinarily remain stationary and the planetary gear 842, rolling on said internal gear will turn the spider 326 in the same direction, but at a fraction of the speed depending on the proportion of the gears; but, if the spider 326 cannot turn or if it is suddenly arrested, the internal gear 843 can take the motion, turning clock-wise, and thus preventing burning out the motor or injuring the mechanism by a sudden arrest of the armature.

Back of the gear 843 and its drum as viewed in Fig. 3, the hub 847 of the spider 326 has fast thereon a disk 848, which disk has a stop shoulder 850 engaged by a stop lever 851, which is pivoted at 852 to the frame plate 127. Said stop lever at its lower end is pivoted to a piece 853, slidably mounted on said frame plate.

The slide 853 is connected by a long link 854 with a lever arm 855 pivoted at the front of the machine and bearing a stud 856 (Fig. 13) lying in front of a downward extension of the arm 711, which is fast on the rock shaft 222. The construction is such that, whenever this shaft is rocked, the stop lever 852 will be tripped and the shaft 326 permitted to turn. It will be noted that, when the disk 848 is arrested by the stop 852, the mechanism of the computing machine has already been stopped gently by the wrist pin 325 coming to a dead center, so that no shock whatever is imparted to said mechanism. The armature of the motor is not stopped suddenly, but can continue to turn until stopped by the friction of the brake 844.

In this machine the motor is normally stationary and the devices just described are utilized to start it. A sliding link 857 lying just outside the frame plate 127 has a long stud 858 projecting inward through a vertical slot in said frame plate, and said link 857 has an ear 860 projecting over a high portion of the slide 853 and normally held in upper position thereby; but, when said slide is drawn toward the front of the machine, the link 857 can drop down to a lower position. At its upper end this link is pivoted to a lever arm 861 pivoted to the side plate at 862 and drawn downward by a spring 863. This lever arm has a latch-like tooth 864 adapted to be engaged by a series of studs 865 projecting from the disc 848, and also by a final stud 866. The long stud 858 rests underneath the spring arm of the upper one of a pair of spring contacts 867 included in the circuit of the motor, and normally holds the circuit broken. The circuit is closed when the slide 853 is pulley forward and the link 857 drops down. Toward the end of a rotation of the disk 858 the first stud 855, to engage the tooth 854, raises the link 857 and breaks the circuit. The studs 865 are screwed into the disc so as to be removable. It will be perceived that with the studs in place, as shown, the circuit will be broken before the end of the cycle, which will be completed by the momentum of the motor. These studs may be inserted or removed as found advantageous. If it is found that the motor slows down too much, one or more of the studs can be removed so that the circuit will not be broken so early in the cycle; or, if desired, they can all be removed and let the circuit be broken only by the final stud 866. This furnishes a very simple and convenient mode of regulating the point in the cycle at which the circuit is broken. Before the last stud 866 gets out from under the tooth 864, the slide 853 will have returned to normal position and locked the link 857 in its upper position, where the circuit is broken. Also, the stop lever 851 will have returned to its locking position and the disk 848 and spider 326 will be arrested after completing a single rotation.

It will be perceived that the motor will be started by anything that rocks the shaft 222. In the specific machine, herein described in detail, this is done by those keys, which determine the character of the operation, viz., by the total key, acting through the device 724, Fig. 2; by the subtract key, acting through the arm 599, Fig. 38; and by the multiplying key, acting through the arm 711, Fig. 13. Each of these keys not only starts an operating cycle, but also locks the numeral keys against operation during such cycle.

In case the multiplying key is held down for a succession of operations, it will be perceived that the motor will continue to run without stopping because the slide 853 will be held in its forward position as long as this key is held down. The circuit will be broken momentarily toward the end of each cycle, but will immediately be closed again so that the machine can continue to run. The operator can count the cycles and if, for example, he wishes to multiply by seven, at the beginning of the seventh cycle he can release the key. It will be recalled, however, that the key will not return to normal position until near the end of the cycle. This will occur in time to stop the motor, but too late to return the stop carriage 106 to normal position. He may, therefore, strike the zero key and thus step said carriage to the next place to the left, whereupon he can depress the multiplying key a second time to multiply by the tens digit of the multiplier; and so on. After the last multiplication he can restore the stop carriage with the correction key.

The motor bar 120 is used to initiate a cycle in adding operations, idle operations and non-add operations. This bar is mounted on two stems 870 (Fig. 6) which are spaced apart as will be understood by the designations MB in Fig. 5. These two stems are connected at their lower ends by being pivoted to the arms of a bail 871, which is pivoted on the cross shaft 541 in order to cause the two stems to move up and down in unison. The lefthand one of the two stems 870 has a rearwardly projecting arm 872, which overlies an extension of the stud 223, which, as hereinbefore explained, is mounted on an arm of the bail 221, and is interlocked with the arm 223, which is fast on the rock shaft 222. The construction is such that a depression of this bar both locks the numeral keyboard and starts the motor by rocking said shaft.

In order to prevent the motor from being started at certain improper times, the following means are provided: It will be recalled that the lever 703 (Fig. 3) is depressed when the multiplying key 123, or the non-add key 122 is in a partially depressed position, and that it is also depressed when the correction key 125 is out of its normal position. In order to open the motor circuit at such times, said lever 703 has on its rear end a stud 873, which overlies a long flat flexible strip consisting of a conductor 874 included in the motor circuit and with insulating strips above and below it, said conductor carrying one of a pair of contacts 875, the other one of which is carried by a conducting bar 876 which, as best shown in Fig. 5, extends across the front of the machine and at its right hand end carries one of another pair of contacts 877, the other of which is carried by a flexible connecting strip 878 which underlies a stud 880 on the rear end of the lever 712. It will be recalled that this lever is depressed whenever the total key 124 or the subtract key 121 is in a partially depressed position. An incomplete operation of any of said keys thus breaks the motor circuit. The conductor bar 876 may conveniently be mounted on the frame bar 140 and suitably insulated as shown in Figs. 4 and 5.

Where a reference numeral is employed in a claim, such numeral is intended merely as a convenient means for pointing out the recited part in the specific machine illustrated in the drawings, and it is not intended as a limitation on the claim.

The register construction described herein, and especially the transfer mechanism thereof, is not claimed herein but is claimed in a divisional application filed December 11, 1937, Serial No. 179,265.

The means for effecting and controlling the engagement of the register with and its disengagement from its actuating racks to bring about various operations such as adding, subtracting, non-add, and total taking, are not claimed herein but are claimed in a divisional application filed October 27, 1939, Serial No. 301,560.

What I claim as my invention and desire to secure by Letters Patent is:

1. In an adding machine having an operating mechanism, the combination which includes a stop carriage provided with a rack, feed dogs for said rack, and an interlock between said feed dogs and said operating mechanism to assure that said dogs are in correct position during the operation of said mechanism.

2. In an adding machine having operating mechanism, the combination which includes a dog rocker, a stop carriage provided with a rack, and feed dogs for said rack including a loose dog, means whereby said operating mechanism restores said carriage, and an inter-lock between said dog rocker and said operating mechanism to assure that said loose dog is in engagement with said rack when the carriage is restored.

3. In an adding machine having operating mechanism and a stop-carriage provided with a rack, the combination which includes feed dogs for said rack, means whereby said operating mechanism restores said carriage, and a device operated by said mechanism and capable on occasion of forcing said dogs into correct position before restoring said carriage.

4. In a computing machine for computing algebraic balances and which includes a register, actuators for said register, keys for controlling said actuators, operating mechanism, and means whereby said operating mechanism when functioning may set a predetermined element of the machine for subtraction, said means including a part normally in effective position, the combination which includes a part which signifies by its position whether or not a key has been operated, a part which signifies by its position whether the register contains a positive or a negative balance, and two deflecting devices for said normally effective part, one controlled by each of said signifying devices and either of which may deflect said normally effective part and render it ineffective, one in case a key has been operated and the other in case the register contains a positive balance.

5. In a computing machine including a set of keys, a carriage carrying devices of different denominations set under control of said keys, one denomination at a time, and operating mechanism, the combination which includes a reciprocating carriage-returning device having an idle stroke under the impulsion of a spring and a positive return stroke on which it returns the carriage, and a repeat key acting to block the idle stroke of said returning device.

6. The combination of a hook reciprocated by the operating mechanism of a computing machine, a stop carriage, a device operated by said hook for returning said carriage, a spring which gives said hook its idle stroke, and a repeat key for blocking said hook on its idle stroke.

7. In a computing machine having registering mechanism for computing both positive and negative balances, numeral keys, a subtraction key, mechanism capable of printing totals, operating mechanism, and means whereby on a blank cycle certain elements of the machine are automatically set for addition or subtraction depending on the sign of the balance accumulated by said registering mechanism, the combination which includes a total key, a lock for said total key operated by said subtraction key and under control of said numeral keys and maintained in effective position during a cycle, and means for releasing said lock on a subsequent blank cycle.

8. In a computing and recording machine having means for computing totals and for printing items and totals and having a total key and one or more other control keys, the combination which includes a special type bar carrying designation types, a stop bar (801) controlled by said other control key or keys for arresting said type bar in printing position, means whereby said total key disables said stop bar, and means controlled by said total key for arresting said type bar.

9. In a computing and recording machine having a register shiftable to an add position and to a subtract position and capable of computing positive and negative totals, said register having a frame, and means capable of printing two kinds of totals, namely, totals with and without clearing, the combination which includes a special type bar carrying designation types, two stops on the frame of said register for arresting said type bar in one or another position when printing one of said kinds of total depending on whether such total is positive or negative, and a stop device acting when printing the other kind of total, said device shifting with said register to add and subtract positions and arresting said type bar in one position for a positive total and in another position for a negative total.

10. In a computing machine having registering mechanism for computing both positive and negative balances, numeral keys, a subtraction key, mechanism capable of printing totals, operating mechanism, and means whereby certain elements of the machine are automatically set for addition or subtraction depending on the sign of the balance accumulated in the register, the combination which includes said subtraction key, means controlled thereby for setting certain elements of the machine for subtraction, and means acting to prevent an operation of said total printing mechanism in a cycle of the machine immediately following a cycle in which said subtraction key was operated.

11. In a computing and recording machine having means for printing amounts, a register having a frame, and actuators for said register, said register movable to one position for positive operation and to another position for negative operation, the combination which includes a special type bar carrying designation types, and means on said registering frame acting in total taking operations to arrest said type bar in one and the other of two positions depending on which of the two said positions the register occupies at the time.

12. In a computing and recording machine having means for printing items and totals, a register having a frame, and actuators for said register, said register movable to one position for positive operation and to another position for negative operation, the combination which includes a special type bar carrying designation types, means on said register frame acting to arrest said type bar in one and the other of two positions depending on which of the two said positions the register occupies at the time, means restraining said type bar in computing operations, and means acting in total-printing cycles to disable said restraining means and to permit said bar to move until arrested by said means on the register frame in order to print signs to distinguish positive and negative totals.

13. In a computing and recording machine including a register having a frame, said register set to one position for positive operations and to another position for negative operations, amount printing means, and devices settable to cause said amount printing means to print positive and negative totals under the control of said totalizer, the combination which includes a special type bar carrying designation types, a stop device for said bar normally out of active position, means whereby said settable devices release said stop device to move to active position, said stop device being arrested by the frame of said register in one or the other of two positions depending on the position of said register, so as to arrest said type bar in positions for the printing of designations distinguishing positive and negative totals.

14. In an adding and subtracting machine having registering mechanism for computing positive and negative balances, a subtraction key and mechanism set thereby to condition the machine for subtraction, operating mechanism, and means whereby on a blank cycle certain elements of the machine are automatically set for addition or subtraction depending on the sign of the balance accumulated by said registering mechanism, the combination which includes a total key, a lock for said total key operated by said subtraction-conditioning mechanism and thereby maintained locked during a subtracting operation, means for maintaining said lock set after the subtracting operation, and means operated during a blank cycle, when the subtraction key was not depressed for releasing said maintaining means.

WALTER W. LANDSIEDEL.

CERTIFICATE OF CORRECTION.

Patent No. 2,203,533.                                               June 4, 1940.

WALTER W. LANDSIEDEL.

It is hereby certified that error appears in the printed specification of the above numbered patent requiring correction as follows: Page 3, first column, line 56, for the word "study" read --stud--; and second column, line 32, for "plates" read --platen--; page 5, first column, line 31, for "ball" read --bail--; page 6, first column, line 34, for "projection" read --projecting--; page 14, first column, line 39, for "560,667" read --560,557--; page 19, second column, line 47, after "occurs" insert --also--; page 22, first column, line 65, for "ball-fashion" read --bail-fashion--; and that the said Letters Patent should be read with this correction therein that the same may conform to the record of the case in the Patent Office.

Signed and sealed this 30th day of July, A. D. 1940.

Henry Van Arsdale,
Acting Commissioner of Patents.

(Seal)